US012579589B2

(12) United States Patent
Sagong et al.

(10) Patent No.: US 12,579,589 B2
(45) Date of Patent: *Mar. 17, 2026

(54) RECIPE PROVIDING SYSTEM AND METHOD

(71) Applicant: CJ CHEILJEDANG CORPORATION, Seoul (KR)

(72) Inventors: Hun Gu Sagong, Suwon-si (KR); Sung Yong Park, Suwon-si (KR); Hyo Jung Yoon, Suwon-si (KR); Sung Woo Shine, Suwon-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 193 days.

This patent is subject to a terminal disclaimer.

(21) Appl. No.: 17/436,444

(22) PCT Filed: Mar. 5, 2020

(86) PCT No.: PCT/KR2020/003124

§ 371 (c)(1),
(2) Date: Sep. 3, 2021

(87) PCT Pub. No.: WO2020/180131

PCT Pub. Date: Sep. 10, 2020

(65) Prior Publication Data

US 2022/0188948 A1 Jun. 16, 2022

(30) Foreign Application Priority Data

Mar. 6, 2019 (KR) ........................ 10-2019-0025904
Mar. 3, 2020 (KR) ........................ 10-2020-0026684

(51) Int. Cl.
*A23L 5/10* (2016.01)
*A47J 36/32* (2006.01)
*G06Q 50/12* (2012.01)

(52) U.S. Cl.
CPC ................ *G06Q 50/12* (2013.01); *A23L 5/10* (2016.08); *A47J 36/321* (2018.08); *A23V 2002/00* (2013.01)

(58) Field of Classification Search
CPC ........... G06Q 50/12; A23L 5/10; A47J 36/321
See application file for complete search history.

(56) References Cited

U.S. PATENT DOCUMENTS 9,012,814 B2 4/2015 Park et al.
10,210,444 B2 2/2019 Kamei et al.
(Continued)

FOREIGN PATENT DOCUMENTS

JP 2002168453 A 6/2002
JP 2003-307313 A 10/2003
(Continued)

OTHER PUBLICATIONS

International Search Report for International Application No. PCT/KR2020/003124 mailed Jun. 9, 2020 (4 pages), Including English Translation.
(Continued)

*Primary Examiner* — Steven N Leff
(74) *Attorney, Agent, or Firm* — Morgan, Lewis & Bockius LLP

(57) ABSTRACT

According to an embodiment of the present disclosure, a recipe providing system may include a user cooking apparatus that cooks a product to be cooked according to a recipe, a user terminal that provides identification information on the product to be cooked and information on the user cooking apparatus, and a recipe providing device that generates a recipe based on performance of the user cooking apparatus and identification information on the product to be
(Continued)

cooked provided from the user terminal, and provides the generated recipe to the user cooking apparatus and the user terminal.

18 Claims, 19 Drawing Sheets

(56) References Cited

U.S. PATENT DOCUMENTS

| | | | | |
|---|---|---|---|---|
| 10,303,136 | B2 | 5/2019 | Shinomoto et al. | |
| 2005/0193901 | A1* | 9/2005 | Buehler | A23L 5/10 99/468 |
| 2007/0001012 | A1* | 1/2007 | Kim | H05B 6/6441 235/462.23 |
| 2007/0029306 | A1* | 2/2007 | Chun | H05B 6/6441 219/506 |
| 2009/0258332 | A1* | 10/2009 | Do | G09B 21/003 707/999.107 |
| 2010/0140248 | A1 | 6/2010 | Yi et al. | |
| 2010/0192784 | A1 | 8/2010 | Shim et al. | |
| 2012/0107460 | A1* | 5/2012 | Lubrina | F24C 7/08 426/231 |
| 2016/0147208 | A1 | 5/2016 | Shinomoto et al. | |
| 2016/0210536 | A1* | 7/2016 | Cho | G16H 30/40 |
| 2017/0006669 | A1 | 1/2017 | Kamei et al. | |
| 2018/0003687 | A1* | 1/2018 | Minvielle | A23L 5/00 |
| 2018/0082603 | A1 | 3/2018 | Lim | |
| 2019/0053332 | A1 | 2/2019 | Cheng et al. | |

FOREIGN PATENT DOCUMENTS

| | | | |
|---|---|---|---|
| JP | 2006153435 | A | 6/2006 |
| JP | 2017-015383 | A | 1/2017 |
| JP | 2018004139 | A | 1/2018 |
| JP | 6282659 | B2 | 2/2018 |
| JP | 2018049613 | A | 3/2018 |
| KR | 10-1250675 | B1 | 4/2013 |
| KR | 10-1492780 | B1 | 2/2015 |
| KR | 10-2018-0032234 | A | 3/2018 |
| WO | 2015029334 | A1 | 3/2015 |

OTHER PUBLICATIONS

Japanese Office Action issued on Oct. 25, 2022 for corresponding Japanese application No. 2021-552737 (6 pages).

Japanese Office Action issued on Nov. 1, 2022 for corresponding Japanese application No. 2021-552736 (6 pages).

Notice of Allowance issued on Jul. 18, 2023 for the corresponding Japanese patent application 2021-552736 (4 pages including English Translation).

* cited by examiner

SERVER OF COMPANY A
(MANUFACTURER OF
FROZEN DUMPLINGS)
STORING BASIC RECIPE
FOR EACH PRODUCT/EACH
HEAT SOURCE

REQUEST USER
REFERENCE RECIPE

TRANSMIT USER
REFERENCE RECIPE
:OPERATE 700W
MICROWAVE OVEN
FOR 30 SECONDS AND
THEN OPERATE CONVECTION
OVEN AT 200° C FOR
30 SECONDS

SERVER OF COMPANY B
(MANUFACTURER OF OVEN)
CHANGE RECIPE TO BE SUITABLE
FOR OVEN OF COMPANY B

USER PREFERENCE RECIPE
REQUESTED PREFERENCE RECIPE:
UNIFORM HEATING/
REDUCING COOKING TIME/
IMPROVING COOKING
QUALITY, ETC.

TRANSMIT
CHANGED RECIPE

COMBINATION OVEN
OF COMPANY B

FROZEN DUMPLINGS
OF COMPANY A

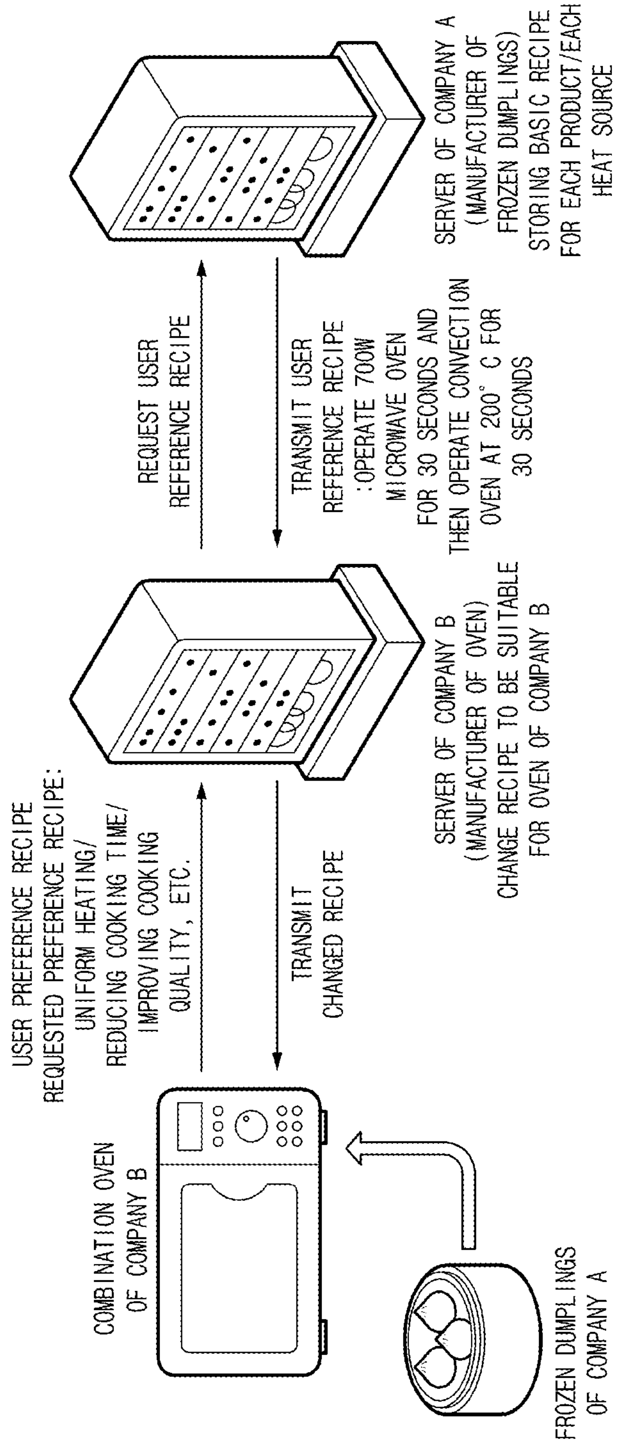

F I G. 13

STORE PERFORMANCE OF 1) TO 4) OF
STANDARD COOKING APPARATUS AND TEMPERATURE DATA
FOR EACH POINT OF PRODUCT ACCORDING TO
HEATING TIME IN SERVER
1) OUTPUT VALUE
2) USAGE AGE OF COOKING APPARATUS
3) PRESENCE OR ABSENCE OF OUTPUT CONTROL DEVICE
(CONTROL OF ON/OFF OF OUTPUT
4) TYPE OF HEAT SOURCE (INCLUDING PRESENCE OR
ABSENCE OF ADDITIONAL HEAT SOURCE)                    ~S10

RECOGNIZE INFORMATION OF 1) TO 4) OF USER COOKING
APPARATUS AND THEN CHECK INFORMATION OF 1) TO 4)
OF USER COOKING APPARATUS THROUGH COMPARISON WITH
1) TO 4) OF STANDARD COOKING APPARATUS STORED IN SERVER    ~S20

IDENTICAL                    DIFFERENT

IDENTIFY DATA FOR EACH
POINT OF PRODUCT OF          S30~
STANDARD COOKING APPARATUS

GENERATE PREDICTED
TEMPERATURE OF USER COOKING
APPARATUS BY USING DATA FOR
EACH POINT OF PRODUCT OF     ~S40
PRODUCT OF STANDARD COOKING
APPARATUS SIMILAR THERETO

GENERATE HEATING TIME RECIPE ACCORDING TO
COOKING PURPOSES OF 1) TO 4) BASED ON TEMPERATURE
DATA FOR EACH POINT OF PRODUCT
1) UNIFORM INTERNAL TEMPERATURE
2) SPECIFYING OF LOWEST/HIGHEST TEMPERATURE
3) AVERAGE TEMPERATURE & SHORTENING OF COOKING TIME,
4) MAXIMUM SURFACE TEMPERATURE VALUE                  ~S50

COOKING ACCORDING RECIPE                              ~S60

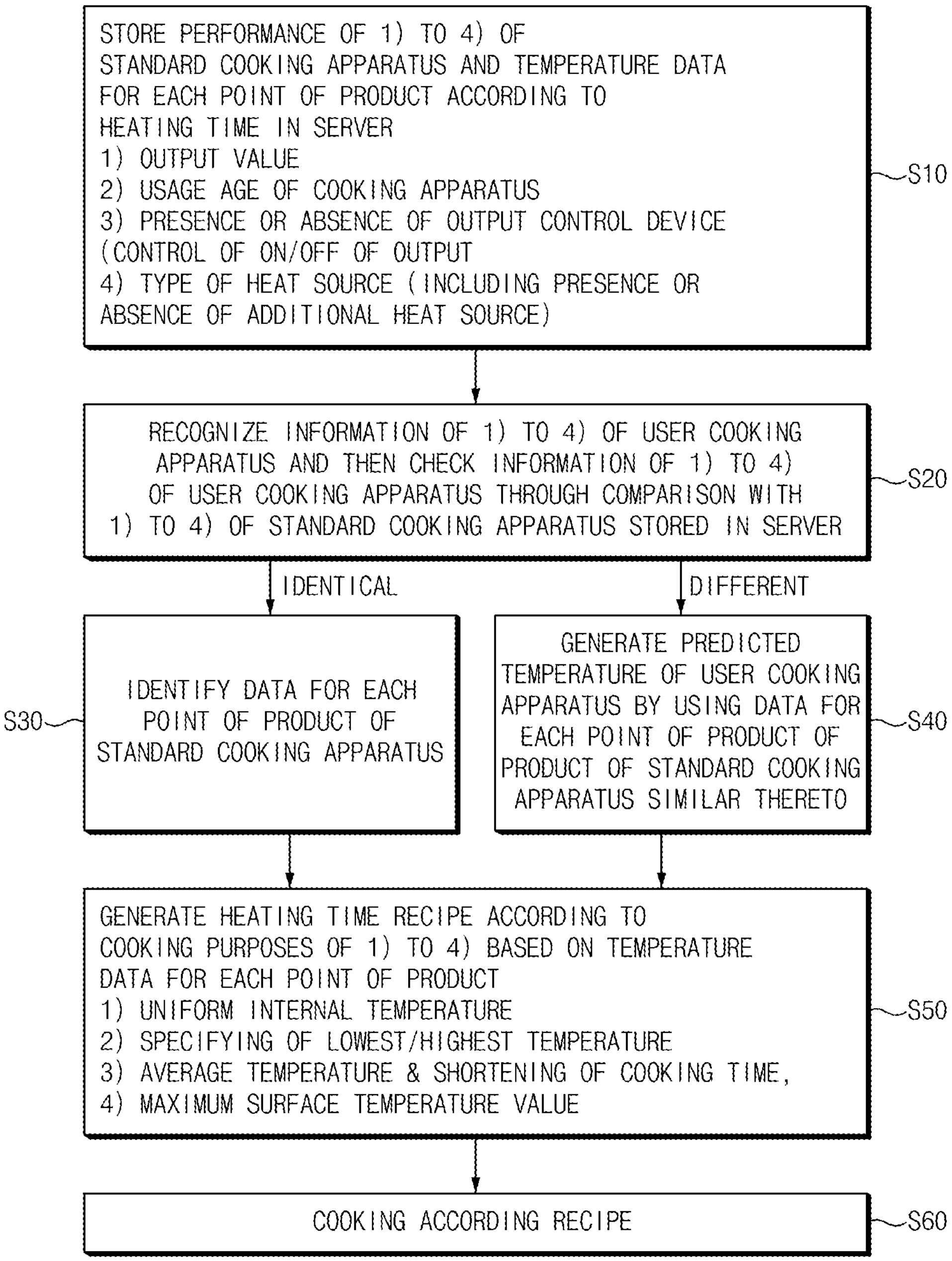

FIG.15

RECIPE PROVIDING SYSTEM AND METHOD

This application is a National Stage Application of PCT/KR2020/003124, filed 5 Mar. 2020, which claims benefit of Serial No. 10-2019-0025904, filed 6 Mar. 2019 in Republic of Korea, and Serial No. 10-2020-0026684, filed 3 Mar. 2020 in Republic of Korea, and which applications are incorporated herein by reference. To the extent appropriate, a claim of priority is made to each of the above disclosed applications.

TECHNICAL FIELD

Embodiments disclosed herein relate to a technique for providing a recipe suitable for an object to be cooked to a cooking apparatus.

BACKGROUND ART

With social changes such as the increase in single-person households, interest and demand for processed foods that are simple to cook and easy to store or carry are increasing. The processed foods have been mainly used to have meals conveniently, but recently, with the appeal of various types of products, the taste and nutrition of processed foods are also becoming an important concern for consumers. The taste and quality of processed foods may vary depending on cooking methods, such as a heating time and a heating temperature. Typically, the package of a processed food may describe an optimal recipe for the product. The consumers may cook the product according to the recipe described. However, the consumer may use various cooking apparatuses, but the recipe cannot be described by reflecting all the characteristics of each of the various cooking apparatuses due to spatial limitations. Therefore, the result of cooking may vary depending on the characteristics of the cooking apparatus, for example, heating unit, heating temperature and output.

DISCLOSURE

Technical Problem

Consumers may use various types of cooking apparatuses such as ovens, microwave ovens, steam ovens and combination ovens. In addition, cooking apparatuses may have different outputs (e.g., 700 W, 1000 W and 1200 W) despite same types, and internal configurations (e.g., a turntable, a grill, a steam device, an infrared heat source, or the like) included in the cooking apparatuses may be different from each other. Therefore, even when a consumer makes a cook according to the recipe described on the package of the product to be cooked, optimal cooking may not be possible due to differences between cooking apparatuses. In addition, it may be difficult for the consumer to derive a cooking method suitable for his or her own cooking apparatus by referring to the recipe described on the package. In addition, when a complicated cooking process is required for optimal cooking, it may be inconvenient for the user to manually make a cook according to a recipe using a cooking apparatus.

Embodiments disclosed herein provide a system and method for cooking a product to be cooked according to a recipe suitable for the characteristics of the product to be cooked and the characteristics of a cooking apparatus to solve the above-described problems and problems posed herein.

The problems of the present disclosure are not limited to the aforementioned problems, and any other problems not mentioned herein will be clearly understood from the following description by those skilled in the art.

Technical Solution

According to an embodiment of the present disclosure, a recipe providing system may include a user cooking apparatus that cooks a product to be cooked according to a recipe, a user terminal that provides identification information on the product to be cooked and information on the user cooking apparatus, and a recipe providing device that generates a recipe based on performance of the user cooking apparatus and identification information on the product to be cooked provided from the user terminal, and provides the generated recipe to the user cooking apparatus and the user terminal.

According to an embodiment, the recipe providing device may include at least one or more servers that stores information of the product to be cooked corresponding to the identification information on the product to be cooked and information on performance of a standard cooking apparatus.

According to an embodiment, the server may store temperature data for each point of the product to be cooked for the standard cooking apparatus.

According to an embodiment, the recipe providing device may generate the recipe based on the temperature data for each point of the product to be cooked for the standard cooking apparatus when the user cooking apparatus is identical to the standard cooking apparatus.

According to an embodiment, the recipe providing device may store information on an output of the standard cooking apparatus, information on a reduction rate of the output according to a usage age and a type of a heat source, and an output control method according to a present or absence of an output control device.

According to an embodiment, the recipe providing device may generate the recipe based on temperature data for each point of the product to be cooked for the standard cooking apparatus, the temperature data matching information on the output of the user cooking apparatus, the usage age, the type of the heat source, and the presence or absence of the output control device.

According to an embodiment, any one of the at least one or more servers may select the standard cooking apparatus of which performance is similar to the performance of the user cooking apparatus when the user cooking apparatus is different from the standard cooking apparatus and generate the recipe by generating temperature data for each point of the product to be cooked with respect to the selected standard cooking apparatus through machine learning.

According to an embodiment, the recipe provided to a user standard cooking apparatus from the recipe providing device may include a cooking time and a cooking intensity, and the recipe provided to the user terminal from the recipe providing device may include a position of the product to be cooked in the user cooking apparatus.

According to an embodiment, the user cooking apparatus may include an output device that provides guidance for a position of the product to be cooked in the user cooking apparatus.

According to an embodiment, the output device may include at least one or more of a lighting, a speaker, or a display.

According to an embodiment, the lighting may illuminate a position of the product to be cooked which is to be placed in a turntable.

According to an embodiment, the speaker may output a position of the product to be cooked through voice.

According to an embodiment, the display may output a position of the product to be cooked as visual information.

According to an embodiment, the user cooking apparatus may acquire the identification information on the product to be cooked using a sensor or receive the identification information on the product to be cooked input by a user through an input device, heat the product to be cooked through a heat means, transmit and receive data to and from the recipe providing device through a communication circuit, and control operation of the cooking apparatus through a processor According to an embodiment, the recipe providing device may change a heating time of the recipe according to a cooking purpose.

According to an embodiment, the cooking purpose includes at least one or more of a uniform internal temperature of the product to be cooked, an arrival to a set lowest or highest temperature, an arrival to a set average temperature, or an arrival to a set surface temperature.

According to an embodiment, the recipe providing device may learn the recipe based on information on one or more of user preference, additional cooking, a satisfaction level for a cooking result, or an improvement.

According to an embodiment, all or some of the at least one or more servers may be implemented as a cloud-based server.

According to an embodiment, a recipe providing method may include recognizing information on a product to be cooked and a cooking apparatus using a user terminal, transmitting the recognized information to a server, selecting temperature data for each point of the product to be cooked for the cooking apparatus and generating a recipe corresponding to a cooking purpose based on the selected temperature data, the temperature data being stored in the server or learned based on the recognized information, and transmitting the generated recipe to the cooking apparatus and the user terminal.

According to an embodiment, the recipe providing device may receive identification information on a product to be cooked and identification information on a cooking apparatus from the cooking apparatus, acquire a recipe corresponding to the product to be cooked and the cooking apparatus by using the identification information, and transmit the acquired recipe to the cooking apparatus. According to an embodiment, the recipe providing device may acquire a basic recipe from a database stored in advance by using the identification information, and generate a recipe to be provided to the cooking apparatus by changing the basic recipe based on the identification information and/or additional information acquired from the cooking apparatus.

According to an embodiment, the cooking apparatus may acquire identification information on the product to be cooked using a sensor, transmit the identification information on the product to be cooked and the identification information on the cooking apparatus to the recipe providing device, receive a recipe corresponding to the product to be cooked and the cooking apparatus from the recipe providing device, and heat the product to be cooked by operating a heating unit according to the recipe.

According to an embodiment, the recipe providing device may be a server, a user terminal such as a mobile device or a personal computer, or a combination thereof. The cooking apparatus may be, for example, one of various types of apparatuses, such as a microwave oven, an oven, a steam oven, and a combination oven.

According to an embodiment, the identification information on the product to be cooked may an exterior image of the product to be cooked and may be acquired through a radio frequency identification (RFID) tag, a QR code, a one-dimensional barcode, or a multi-dimensional barcode included in the product to be cooked. As another example, the identification information on the product to be cooked may be input by a user.

According to an embodiment, the recipe may include information on a heating time, a heating unit, a heating temperature and/or rotation of a turntable. The recipe may include information on an optimal cooking position in the cooking apparatus. The recipe may include information on preheating of the cooking apparatus.

According to an embodiment, the recipe providing device may acquire a recipe corresponding to a product to be cooked and a cooking apparatus from a pre-stored database. The recipe providing device may acquire a recipe by performing a preset operation based on the identification information on the product to be cooked and the cooking apparatus. The recipe providing device may receive identification information of a product to be cooked and a cooking apparatus from an external device other than the cooking apparatus, and provide a recipe corresponding to the product to be cooked and the cooking apparatus to the external device.

According to an embodiment, the recipe providing device may acquire a recipe based on the characteristics of a cooking apparatus. The characteristics of the cooking apparatus may include, for example, a period of use, usage time or number of uses of the cooking apparatus, an internal volume of the cooking apparatus, an internal configuration of the cooking apparatus, an output of the cooking apparatus, and the like.

According to an embodiment, the recipe providing device may generate a recipe to simultaneously or sequentially use a plurality of heating unit included in the cooking apparatus to shorten a cooking time. The recipe providing device may generate a recipe in consideration of a texture of the product to be cooked. The texture of the product to be cooked may be selected according to a user's input.

According to an embodiment, the recipe providing device may receive feedback from the user and change the recipe based on the user's feedback. As another example, the recipe providing device may transmit the user's feedback to an external device to change the recipe according to the user's feedback.

Advantageous Effects

According to the embodiments disclosed herein, by providing an appropriate recipe based on identification information on a product to be cooked and a cooking apparatus, a user lacking knowledge about cooking methods and cooking apparatus may conveniently and quickly cook the product to be cooked according to the user's preferences.

In addition, various effects may be provided that are directly or indirectly understood through the disclosure.

DESCRIPTION OF DRAWINGS

FIG. 13 is a diagram for describing an exemplary recipe provided by a recipe providing device according to an embodiment.

FIG. 15 is a flowchart for describing operation of a recipe providing device according to an embodiment.

In the description of the drawings, the same or similar reference numerals may be used for the same or similar components.

MODE FOR INVENTION

Figure 1:
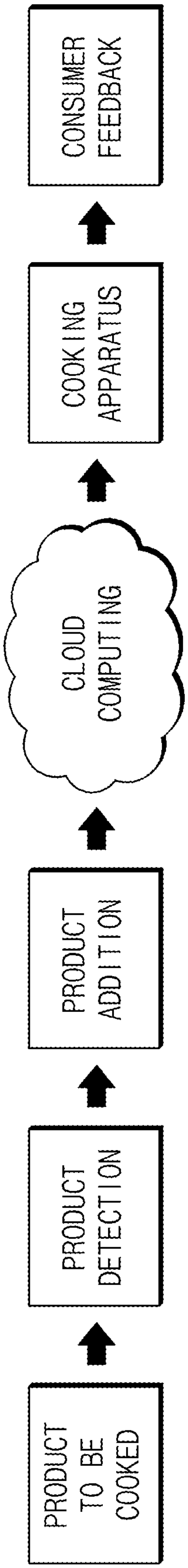
FIG. 1 illustrates an operating environment of a recipe providing system according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present. The sizes and thicknesses of components shown in the drawings are illustrated for convenience of description, and the present disclosure is not necessarily limited to the sizes and thicknesses of the components as shown.

Hereinafter, a recipe providing system and a recipe providing method according to various embodiments will be described with reference to the accompanying drawings.

FIG. 1 illustrates an operating environment of a recipe providing system according to an embodiment.

Referring to FIG. 1, a recipe providing system according to an embodiment may automatically provide a recipe optimized according to a product to be cooked and a cooking apparatus when the product to be cooked, such as processed food, is cooked using the cooking apparatus, and automatically cook the product to be cooked according to the provided recipe. Furthermore, the recipe providing system may provide a feedback function to change the recipe according to a user's preference.

A recipe providing system according to an embodiment may include a product to be cooked, a cooking apparatus that cooks the product to be cooked, and a server that transmits and receives data to and from the cooking apparatus and provides a recipe to the cooking apparatus. According to implementations of the present disclosure, the server may be a single server or a plurality of servers. In the case of a single server, the single server may provide a function of providing recipes and a function of changing recipes together. In the case of a plurality of servers, the plurality of servers may include a first server that performs a recipe providing function, a second server that performs a recipe changing function, or the like in a manner to distribute the necessary functions. (for example, the first server may include a food-dedicated DB to abundantly store basic recipe information for each food, and the second server may include a cooking apparatus-dedicated DB and an algorithm function to process and change basic recipe information to be suitable for each cooking apparatus, thus making it possible to optimize a recipe in consideration of both food characteristics and equipment characteristics. In particular, technical expertise and ease of management may be improved by separating entities operating of the servers.) According to implementations of the present disclosure, the recipe providing system may further include a user terminal for relay between the cooking apparatus and the server.

A product to be cooked may include contents (food) and a package. The package of the product to be cooked may include identification information that allows the cooking apparatus to recognize the product. A vendor of a product to be cooked may include identification information in a product in various forms in manufacturing the product.

The cooking apparatus may detect a product to be cooked using a sensor. For example, the cooking apparatus may recognize the product to be cooked using a camera, a QR code reader, an RFID reader, a barcode reader, speech recognition, or information input by a user. After the cooking apparatus has recognized the product to be cooked, the product to be cooked may be put into the cooking apparatus. The cooking apparatus may provide guidance for an arrangement position of the product to be cooked or the contents of the product to be cooked by reflecting the characteristics of the product to be cooked and the cooking apparatus. The cooking apparatus may receive information on a position to be guided from the server. The cooking apparatus may acquire a recipe for the product to be cooked through cloud computing.

The server may provide a recipe optimized using an optimization algorithm. The server may receive identification information on the product to be cooked and the cooking apparatus from the cooking apparatus. The server may generate an optimized recipe by analyzing the identification information. The server may transfer the recipe to the cooking apparatus.

The cooking apparatus may cook the product to be cooked according to the recipe transferred. The cooking apparatus may receive a plurality of recipes, and when one of the plurality of recipes is selected (e.g., selected by a consumer or automatically selected based on a usage history), the cooking apparatus may cook the product to be cooked according to the selected recipe.

The consumer may provide feedback on the recipe. The server may appropriately change an algorithm used to derive the recipe based on the consumer's feedback.

Figure 2:
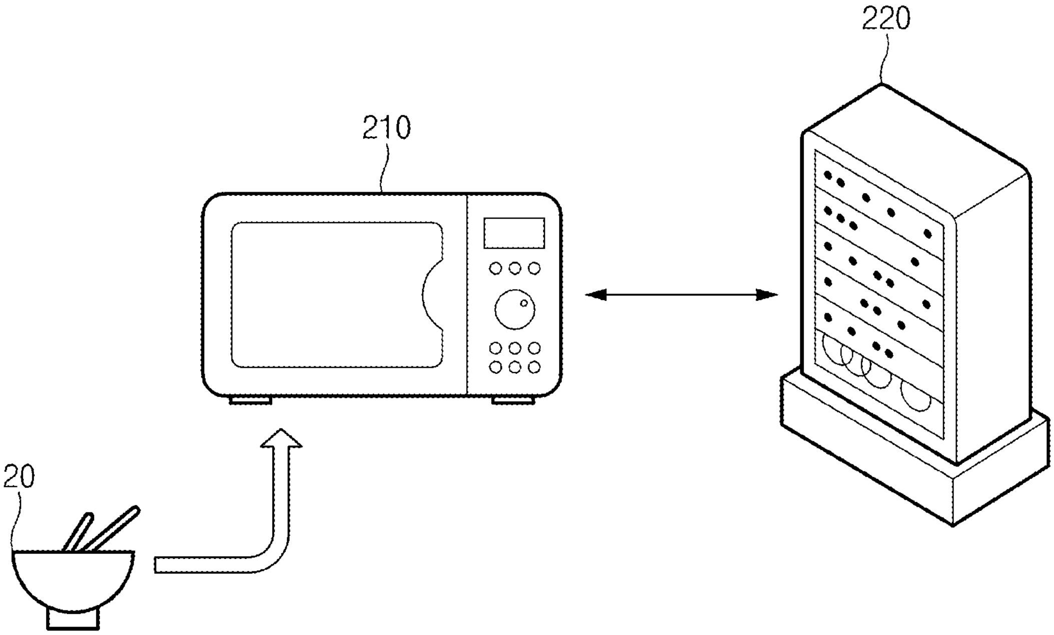
FIG. 2 illustrates a configuration of a recipe providing system according to an embodiment.

FIG. 2 illustrates a configuration of a recipe providing system according to an embodiment.

Referring to FIG. 2, a recipe providing system according to an embodiment may include a product to be cooked 20, a cooking apparatus 210, and a server 220.

The product to be cooked 20 may include pre-cooked food such as home meal replacement (HMR) and a container including the food. The product to be cooked 20 may be a product that can be cooked after being directly putted into the cooking apparatus 210 without separating the food from the container. However, the present disclosure is not limited thereto, and it may be required to separate food from a container according to implementations.

The cooking apparatus 210 may be one of various types of apparatus such as an oven, a microwave oven (microwave oven), a steam oven, or a combination oven. The combination oven may include multiple heat sources, such as, grills, microwaves, infrared and steam, and the like.

The cooking apparatus 210 may include a sensing device for identifying a type of the product to be cooked 20. The sensing device may include, for example, a camera, a QR code reader, a radio frequency identification (RFID) reader, a barcode reader, or an optical scanner. The cooking apparatus 210 may transmit/receive data to and from the external server 220. The cooking apparatus 210 may transmit and receive data, such as identification information on the product to be cooked 20, a basic recipe, an optimized recipe, a recipe in which a user's feedback is reflected, and other cooking information (temperature, time, heat source driving state, heat source output, or the like).

The server 220 may be a component for implementing cloud computing and may store data and transmit/receive data to and from the cooking apparatus 210. The server 220 may store a basic recipe for each product to be cooked 20 in the form of, for example, a look-up table. The server 220 may generate an optimized recipe by modifying a pre-stored basic recipe based on information on the cooking apparatus 210. In addition, the server 220 may modify the recipe based on the user's feedback to generate an optimized recipe.

The cooking apparatus 210 may transmit identification information on the product to be cooked 20 and identification information on the cooking apparatus 210 to the server 220. The server 220 may acquire a basic recipe from a pre-stored database (lookup table) based on the transmitted identification information. The server 220 may change the basic recipe into an optimized recipe by applying an optimization algorithm using specific conditions such as the types and outputs of the heat sources included in the cooking apparatus 210. The server 220 may transmit the optimized recipe to the cooking apparatus 210. The cooking apparatus 210 may automatically cook the product to be cooked 20 according to the optimized recipe. Accordingly, the user may merely allow the cooking apparatus 210 to recognize the product to be cooked 20 and place the product to be cooked 20 in a cooking area of the cooking apparatus 210, making it possible to conveniently and deliciously cook the product to be cooked 20 according to the optimized recipe.

Figure 3:
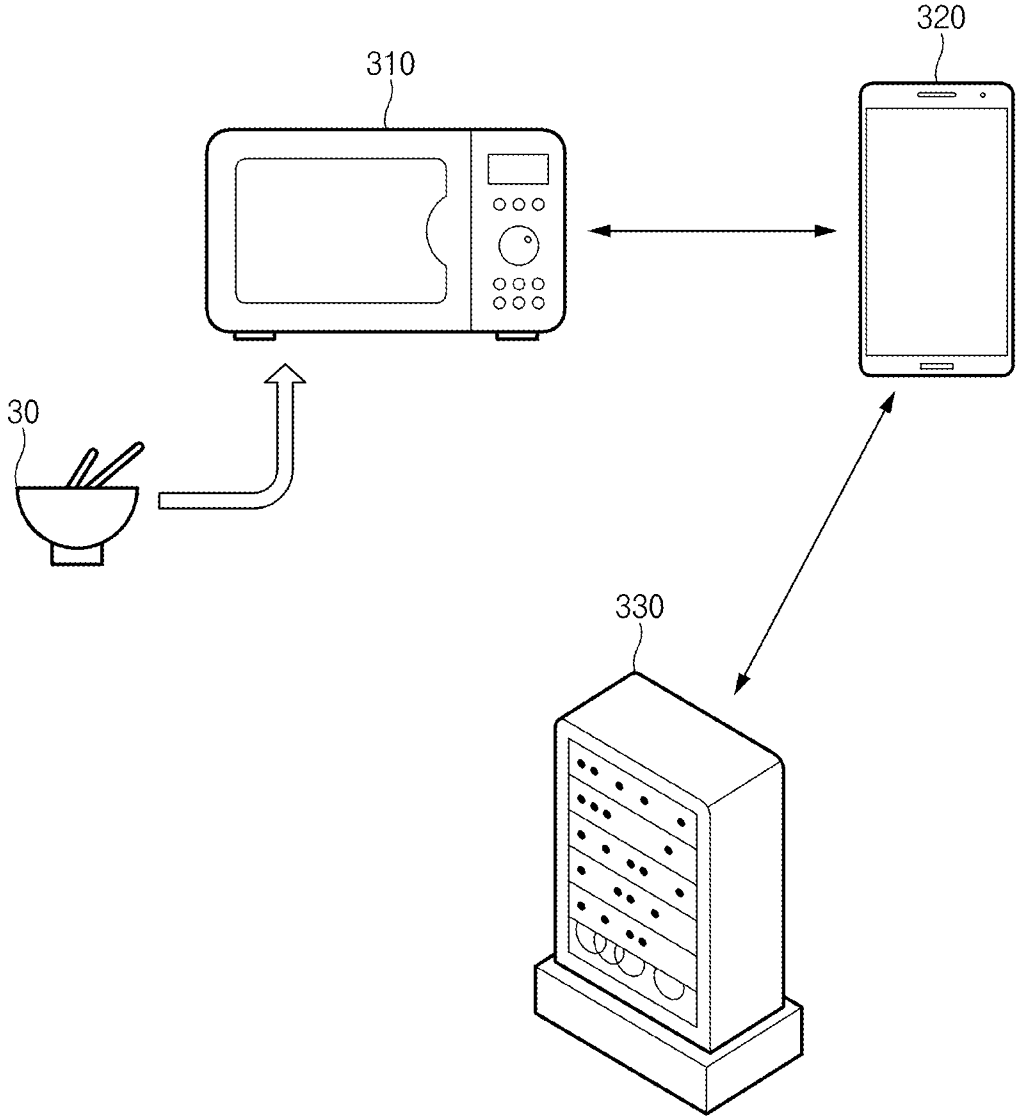
FIG. 3 illustrates a configuration of a recipe providing system according to an embodiment.

FIG. 3 illustrates a configuration of a recipe providing system according to an embodiment.

Referring to FIG. 3, a recipe providing system according to an embodiment may include a product to be cooked 30, a cooking apparatus 310, a user terminal 320, and a server 330.

The product to be cooked 30, the cooking apparatus 310, and the server 330 of FIG. 3 may correspond to the product to be cooked 20, the cooking apparatus 210, and the server 220 of FIG. 2, respectively.

According to an embodiment, the user terminal 320 may function as a relay device between the cooking apparatus 310 and the server 330. According to an embodiment, the user terminal 320 may receive data from the cooking apparatus 310 and transmit the received data to the server 330. For example, the user terminal 320 may receive identification information on the product to be cooked 30 and the cooking apparatus 310 from the cooking apparatus 310, and transmit the received identification information to the server 330. According to an embodiment, the user terminal 320 may receive data from the server 330 and transmit the received data to the cooking apparatus 310. For example, the user terminal 320 may receive a recipe from the server 330 and transmit the received recipe to the cooking apparatus 310.

Figure 4:
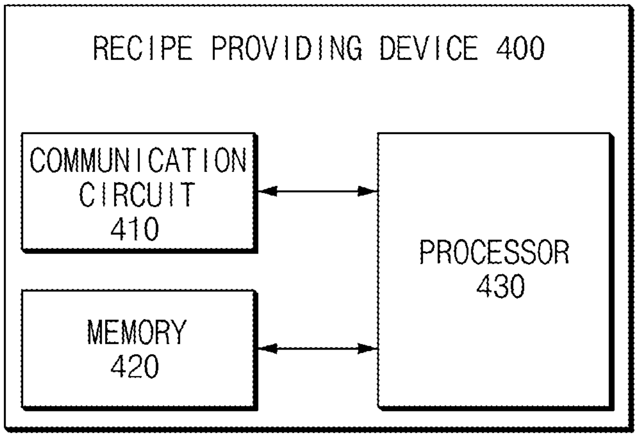
FIG. 4 is a block diagram illustrating a configuration of a recipe providing device according to an embodiment.

FIG. 4 is a block diagram illustrating a configuration of a recipe providing device according to an embodiment.

Referring to FIG. 4, a recipe providing device 400 according to an embodiment may include a communication circuit 410, a memory 420, and a processor 430. The recipe providing device 400 may be, for example, a server. For another example, the recipe providing device 400 may be a user terminal such as a mobile device or a personal computer. Here, the user terminal may be different from the user terminal 320 of FIG. 3 and may function the same as the server 220 of FIG. 2.

The communication circuit 410 may be configured to communicate with an external device. For example, the communication circuit 410 may communicate with the cooking apparatus and may communicate with an external user terminal. The communication circuit 410 may perform communication in various wireless communication methods, such as long term evolution (LTE), Wi-Fi, or Bluetooth, for example.

The memory 420 may include volatile and/or non-volatile memory 420. The memory 420 may store, for example, basic recipes for various products to be cooked, and may store an algorithm for optimizing the basic recipes. The memory 420 may store various instructions to be executed by the processor 430.

The processor 430 may be electrically connected to the communication circuit 410 and the memory 420. The processor 430 may control the communication circuit 410 and the memory 420, and may perform various data processing and data operations.

According to an embodiment, the processor 430 may receive identification information on the product to be cooked and identification information on the cooking apparatus from the cooking apparatus using the communication circuit 410. The identification information on the product to be cooked may be, for example, an exterior image of the product to be cooked captured by the camera. As another example, the identification information on the product to be cooked may be acquired through a radio frequency identification (RFID) tag, a QR code, a one-dimensional barcode, or a multi-dimensional barcode included in the product to be cooked. As another example, the identification information on the product to be cooked may be input by a user. As another example, the product to be cooked may be identified by a sensor inserted into a packaging container, the sensor may detect information (e.g., temperature and humidity) generated during a cooking process, and the detected information may be transferred to the cooking apparatus. The identification information on the cooking apparatus may include information on a model name, specification, type or the like of the cooking apparatus.

According to an embodiment, the processor 430 may acquire a recipe corresponding to the product to be cooked and the cooking apparatus by using the received identification information. The recipe may include, for example, information on a heating time, heating unit and a heating temperature. As another example, the recipe may include information on an optimal cooking position in the cooking apparatus. As another example, the recipe may include information on preheating of the cooking apparatus.

According to an embodiment, the processor 430 may acquire a recipe corresponding to a product to be cooked and a cooking apparatus from a pre-stored database. For example, the processor 430 may search the database for a recipe corresponding to the product to be cooked and the cooking apparatus. A found recipe may not accurately correspond to the product to be cooked and the cooking apparatus. For example, the found recipe may be for a microwave oven of 700 W, and the cooking apparatus may be for a combination oven of 1000 W. In this case, the found recipe may not be suitable for the cooking apparatus. In this case, the processor 430 may generate an optimized recipe by performing a preset operation based on the identification information on the product to be cooked and the cooking apparatus. For example, the processor 430 may change the heating time, the heating unit, the cooking temperature or the like included in the recipe according to a pre-stored optimization algorithm. By appropriately changing the recipe based on the identification information on the product to be cooked and the cooking apparatus, an optimized recipe may be provided.

According to an embodiment, the processor 430 may acquire a recipe based on characteristics of the cooking apparatus. The characteristics of the cooking apparatus may include, for example, a period of use, usage time or number of uses of the cooking apparatus, an internal volume of the cooking apparatus, an internal configuration of the cooking apparatus, an output of the cooking apparatus, and the like. According to an embodiment, the processor 430 may generate a recipe to simultaneously or sequentially use a plurality of heating unit included in the cooking apparatus to shorten a cooking time. According to an embodiment, the processor 430 may generate a recipe in consideration of a texture of the product to be cooked. The texture of the product to be cooked may be selected according to a user's input. According to an embodiment, the processor 430 may receive feedback from the user and change the recipe based on the user's feedback. As another example, the processor 430 may transmit the user's feedback to an external device to change the recipe according to the user's feedback. A specific method of modifying a recipe according to a situation will be described in detail with reference to FIG. 6.

According to an embodiment, the processor 430 may receive identification information of a product to be cooked and a cooking apparatus from an external device other than the cooking apparatus, and provide a recipe corresponding to the product to be cooked and the cooking apparatus to the external device. For example, the recipe providing device 400 may be a server, and receives information from a user terminal (e.g., the user terminal 320 of FIG. 3) functioning as a relay device between the cooking apparatus and the recipe providing device 400, and provide the recipe to the user terminal. Herein, the external device may be understood as a term that collectively refers to the cooking apparatus as well as the user terminal.

According to an embodiment, the processor 430 may transmit the acquired recipe to the cooking apparatus. The recipe transmitted to the cooking apparatus may be a recipe changed to be suitable for the product to be cooked and the cooking apparatus through the above-described process.

Figure 5:
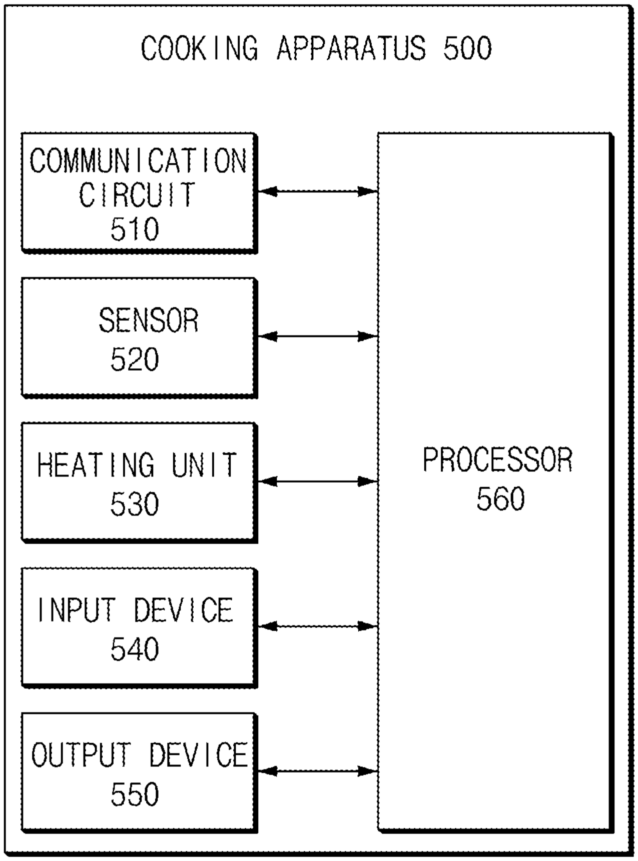
FIG. 5 is a block diagram illustrating a configuration of a cooking apparatus according to an embodiment.

FIG. 5 is a block diagram illustrating a configuration of a cooking apparatus according to an embodiment.

Referring to FIG. 5, a cooking apparatus 500 according to an embodiment may include a communication circuit 510, a sensor 520, a heating unit 530, an input device 540, an output device 550, and a processor 560. The cooking apparatus 500 may be, for example, one of various types of apparatuses, such as a microwave oven, an oven, a steam oven, and a combination oven.

According to an embodiment, the processor 560 may acquire identification information on the product to be cooked using the sensor 520. For example, the processor 560 may acquire identification information on the product to be cooked using an RFID reader, a QR code reader, a barcode reader, or a camera. The processor 560 may acquire additional information (e.g., temperature information and/or humidity information) on the product to be cooked by using an additional sensor (e.g., a temperature sensor and/or a humidity sensor). As another example, the processor 560 may acquire identification information on the product to be cooked from the user through the input device 540. For example, the processor 560 may acquire the identification information by recognizing a speech input through a microphone, or acquire the identification information by a text input by the user (e.g., input of a unique number of a product to be cooked).

According to an embodiment, the processor 560 may transmit identification information on the product to be cooked and identification information on the cooking apparatus 500 to a recipe providing device using the communication circuit 510. The identification information on the cooking apparatus 500 may be stored in a memory of the cooking apparatus 500 in advance.

According to an embodiment, the processor 560 may receive a recipe corresponding to the product to be cooked and the cooking apparatus 500 from the recipe providing device using the communication circuit 510, and operate the heating unit 530 according to the recipe to heat the product to be cooked. The processor 560 may guide a recommended position of the product to be cooked using the output device 550 (e.g., a display, a speaker, and/or a light) according to the recipe. Accordingly, the cooking apparatus 500 may automatically cook the product to be cooked in a method optimized for and the product to be cooked and the cooking apparatus 500.

Figure 6:
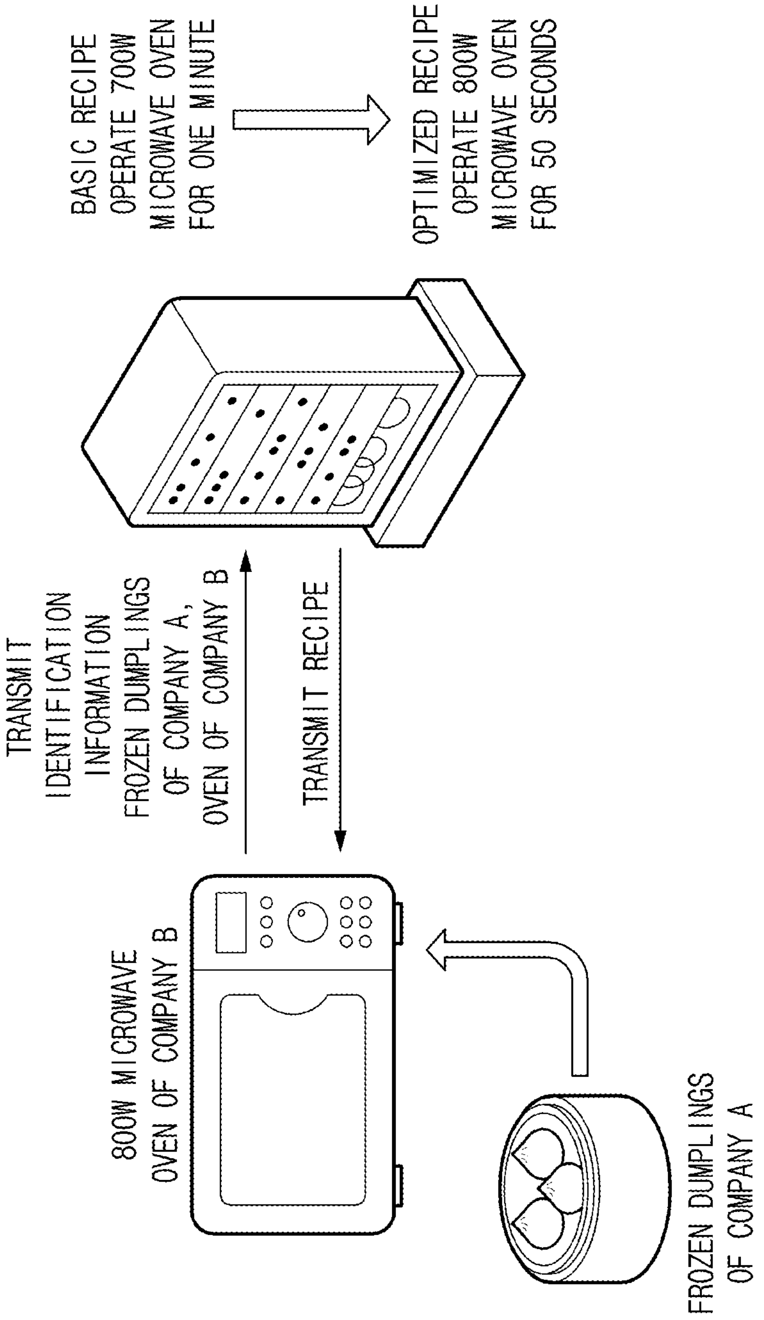
FIG. 6 is a diagram for describing an exemplary recipe provided by a recipe providing device according to an embodiment.

FIG. 6 is a diagram for describing an exemplary recipe provided by a recipe providing device according to an embodiment.

Referring to FIG. 6, a recipe providing device according to an embodiment may provide a recipe to a cooking apparatus. The cooking apparatus may be, for example, a microwave oven of Company B, and the output of the cooking apparatus may be, for example, 800 W. The product to be cooked may be frozen dumplings of Company A. The cooking apparatus may transmit identification information on the product to be cooked and identification information on the cooking apparatus to the recipe providing device.

The recipe providing device may search a pre-stored database for a basic recipe using the received identification information. For example, the recipe providing device may acquire a basic recipe to allow a microwave oven of 700 W to be operated for one minute for the frozen dumplings of Company A. Table 1 below describes exemplary basic recipes pre-stored in the server.

TABLE 1

| Product to be cooked | 700 W MW | 1000 W MW | IR |
|---|---|---|---|
| Bulgogi Rice Bowl Retort | 55 sec operation, 10 sec suspension, 10 sec operation | 42 sec operation, 6 sec suspension, 8 sec operation | — |
| Dumpling | 1 min operation | 50 sec operation | 1 min |

The recipe providing device may change the acquired basic recipe to be suitable for the product to be cooked and the cooking apparatus. For example, the recipe providing device may recognize that the output of the cooking apparatus is 800 W based on the received identification information, and generate an optimized recipe to operate the oven for 50 seconds because a cooking time needs to be reduced compared to the basic recipe for optimal cooking when the output is 800 W. The recipe providing device may provide an optimized recipe to the cooking apparatus, and the cooking apparatus may heat the product to be cooked for 50 seconds using a microwave according to the provided recipe. Hereinafter, various methods for changing a recipe not shown in FIG. 6 will be described below. Table 2 describes an exemplary method for changing recipes according to the characteristics of the cooking apparatus.

TABLE 2

| Heating unit | Basic recipe Cooking apparatus | User cooking apparatus | Note |
|---|---|---|---|
| MW | 700 W | 800 W | Decrease in heating time |
| MW | 700 W | 800 W(including inverter) | Control output at 700 W using inverter |
| Grill | 1000 W | 1200 W | Decrease in temperature variation by increasing fan speed |

<Recipe change according to Output of cooking apparatus> According to an embodiment, a recipe providing device may change a recipe according to an output of a cooking apparatus and a heating unit of the cooking apparatus. For example, when the output of a user's cooking apparatus is higher than an output of a cooking apparatus set in the basic recipe, the recipe providing device may reduce a heating time set in the recipe, For another example, when the output of the user's cooking apparatus is higher than the output of the cooking apparatus set in the basic recipe, and the user's cooking apparatus includes an inverter capable of adjusting the output, the recipe providing device may generate a recipe to reduce the output by using the inverter. As another example, when an increase in temperature variation in an oven is expected due to a high grill output, the recipe providing device may generate a recipe to decrease the temperature variation by increasing the speed of a fan.

In more detail, the recipe providing device according to an embodiment of the present disclosure may store a list of cooking apparatuses, 3D internal structures of the cooking apparatuses, shapes and materials of the internal structures of the cooking apparatuses, a dielectric constant of the material, magnetic permeability, electrical conductivity, specific heat, density, and thermal conductivity of each material, outputs of the cooking apparatuses, and the like.

In addition, the recipe providing device may store information on the overall shape of a product to be cooked, the types, shapes and arrangement of components, a temperature-specific dielectric constant, magnetic permeability, electrical conductivity, thermal conductivity, specific heat, density of each component.

The recipe providing device may store predicted heating information for a stored combination of a cooking apparatus and a product to be cooked as shown in Table 3 below.

TABLE 3

| Appliance ID | Product ID | Appliance Output (W) | Heating Time (s) | Temp of Point 1 | Temp of Point 2 | . . . | Temp of Point n |
|---|---|---|---|---|---|---|---|
| 23AW700D | AEC | 730 | 1 | −15 | −15 | . . . | −15 |
| | | | 2 | −14.3 | −14 | . . . | −15 |
| | | | . . . | . . . | . . . | . . . | . . . |
| | | | m − 1 | 92 | 83 | . . . | 72 |
| | | | m | 92 | 84 | . . . | 75 |
| 23AW700D | AEC | 600 | 1 | −15 | −15 | . . . | −15 |
| | | | 2 | −14.6 | −14.6 | . . . | −15 |
| | | | . . . | | | . . . | . . . |
| | | | m − 1 | 90 | 83 | . . . | 69 |
| | | | m | 91 | 84 | . . . | 69 |
| 23AW700D | AEC | . . . | . . . | | | . . . | . . . |
| | | X | m | 40 | 39 | . . . | 32 |
| | BEG | | | | | . . . | . . . |
| 36US1100WF | BEG | 1120 | 1 | −15 | −15 | . . . | −15 |
| | | | 2 | −13 | −13.5 | . . . | −14 |
| | | | . . . | | | . . . | . . . |
| | | | m − 1 | 95 | 99 | . . . | 89 |
| | | | m | 96 | 99 | . . . | 90 |
| 36US1100WF | BEG | . . . | . . . | . . . | . . . | . . . | . . . |
| | | Y | m | 47 | 45 | . . . | 50 |

As shown in the above table, the recipe providing device may store predicted heating information according to a combination of a cooking apparatus (Appliance ID) and a product to be cooked (Product ID). In this case, Appliance Output (W) may be an output of the cooking apparatus, Heating Time may be a heating time, Temp of Point may correspond to a set position of a product to be cooked. For example, Temp of Point 1 may be a predicted temperature according to a heating time for a lower portion of a product to be cooked (frozen dumplings), Temp of Point 2 may be a predicted temperature according to a heating time for a central portion of the product to be cooked (frozen dumplings), and Temp of Point 3 may be a predicted temperature according to a heating time for an upper portion of the product to be cooked (frozen dumplings). The recipe providing device may store information on a cooking apparatus, information on a product to be cooked, and predicted heating information for a combination of the cooking apparatus and the product to be cooked.

When a recipe request matching the predicted heating information stored in the recipe providing device occurs, the recipe providing device may selectively output information on a heating time suitable for a cooking purpose from the stored predicted heating information.

For example, the recipe providing device may provide a heating time corresponding to the combination of the cooking apparatus (Appliance ID) and the product to be cooked (Product ID) to the cooking apparatus or the user terminal from the stored predicted heating information.

When there is no information corresponding to the combination of the cooking apparatus and the product to be cooked in the predicted heating information stored in the recipe providing device, it may be possible to generate predicted heating information by performing machine learning (multivariate regression) based on the stored predicted heating information and provide the generated predicted heating information to the cooking apparatus or the user terminal. In this case, the predicted heating information generated through machine learning may be stored in the recipe providing device.

<Recipe Change According to Use of Cooking Apparatus>

According to an embodiment, a recipe providing device may change a recipe based on the number of times a cooking apparatus is used. For example, with continuous use of a microwave oven, the output thereof may decrease. The recipe providing device may increase a cooking time of the recipe in consideration of a decrease in output due to continuous use.

For example, the recipe providing device may calculate a output reduction rate according to the usage period of a cooking apparatus, calculate an output of the cooking apparatus according to the output reduction rate, perform <change of the recipe according to the output of the cooking apparatus> based on the calculated output, and provide the changed recipe (e.g., change of a heating (cooking) time) to the cooking apparatus or a user terminal.

In more detail, the recipe providing device may store information on the output reduction rate according to an expiration date of the cooking apparatus as data shown in Table 4.

TABLE 4

| ID | Vendor | Initial Output (W) | Running Time (h) | Reduction Rate (%) | Output (W) |
|---|---|---|---|---|---|
| 23AW700D | AEC | 780 | 0~100 | 99 | 775 |
| 23AW700D | AEC | 780 | 100~200 | 94 | 730 |
| 23AW700D | AEC | 780 | 200~300 | 87 | 680 |
| 23AW700D | AEC | 780 | 300~400 | 77 | 600 |
| 34KS1000A | AEC | 1120 | 0~100 | 100 | 1120 |
| 34KS1000A | AEC | 1120 | 100~200 | 89 | 1000 |
| 34KS1000A | AEC | 1120 | 200~300 | 82 | 920 |
| 34KS1000A | AEC | 1120 | 300~400 | 74 | 830 |
| 24UD700F | BEG | 820 | 0~100 | 98 | 800 |
| 24UD700F | BEG | 820 | 100~200 | 94 | 770 |
| 24UD700F | BEG | 820 | 200~300 | 94 | 770 |
| 24UD700F | BEG | 820 | 300~400 | 85 | 700 |
| 36US1100WF | BEG | 1120 | 0~100 | 100 | 1120 |
| 36US1100WF | BEG | 1120 | 100~200 | 100 | 1120 |
| 36US1100WF | BEG | 1120 | 200~300 | 89 | 1000 |
| 36US1100WF | BEG | 1120 | 300~400 | 71 | 800 |

<Recipe change according to Internal Volume of Cooking apparatus> According to an embodiment, the recipe providing device may change a recipe based on the internal volume of the cooking apparatus. For example, when the internal volume of an oven is smaller than that in the recipe, there is a need to reduce the output of the oven. The recipe providing device may adjust the cooking conditions of the recipe in consideration of the internal volume of the cooking apparatus.

<Recipe Change According to Internal Configuration of Cooking Apparatus>

According to an embodiment, the recipe providing device may change the recipe based on whether a specific configuration is included in the cooking apparatus.

For example, when the cooking apparatus does not include a turntable, the uniformity of heating may decrease, so that it is necessary to extend the cooking time. The recipe providing device may increase the cooking time of a recipe when the cooking apparatus does not include a turntable.

Also, when the cooking apparatus does not have an inverter, the recipe providing device according to an embodiment may change a recipe by changing an output of the cooking apparatus in units of time.

More specifically, when the cooking apparatus does not have an inverter, the recipe providing device may change a recipe to be provided to the cooking apparatus or the user terminal to a recipe that controls the on/off of the cooking apparatus to control the output of the cooking apparatus.

TABLE 5

| ID | Vendor | Set output (W) | Turntable Rotation RPM | Duty Cycle (s) | On time (s) |
|---|---|---|---|---|---|
| 23AW700D | AEC | 700 | 5 | 48 | 48 |
| 23AW700D | AEC | 500 | 5 | 48 | 36 |
| 23AW700D | AEC | 330 | 5 | 48 | 24 |
| 23AW700D | AEC | 150 | 5 | 48 | 12 |
| 34KS1000A | AEC | 1000 | 5 | 48 | 48 |
| 34KS1000A | AEC | 700 | 5 | 48 | 36 |
| 34KS1000A | AEC | 480 | 5 | 48 | 24 |
| 34KS1000A | AEC | 200 | 5 | 48 | 12 |
| 24UD700F | BEG | 700 | 6 | 60 | 60 |
| 24UD700F | BEG | 600 | 6 | 60 | 51 |
| 24UD700F | BEG | 500 | 6 | 60 | 43 |
| 24UD700F | BEG | 400 | 6 | 60 | 35 |
| 24UD700F | BEG | 300 | 6 | 60 | 25 |
| 24UD700F | BEG | 200 | 6 | 60 | 16 |
| 36US1100WF | BEG | 1000 | 6 | 60 | 60 |
| 36US1100WF | BEG | 900 | 6 | 60 | 52 |
| 36US1100WF | BEG | 800 | 6 | 60 | 46 |
| 36US1100WF | BEG | 700 | 6 | 60 | 40 |
| 36US1100WF | BEG | 600 | 6 | 60 | 34 |
| 36US1100WF | BEG | 500 | 6 | 60 | 29 |
| 36US1100WF | BEG | 400 | 6 | 60 | 23 |
| 36US1100WF | BEG | 300 | 6 | 60 | 17 |
| 36US1100WF | BEG | 200 | 6 | 60 | 10 |

As shown in Table 5, when the cooking apparatus does not have an inverter, the recipe providing device may provide the duty cycle and on time of the cooking apparatus to the cooking apparatus or the user terminal to control the output of the cooking apparatus. When having been provided with a recipe having a duty cycle of 60 (s) and an on time of 46 (s), the cooking apparatus may operate (ON) for 46 seconds every 60 seconds and may not operate (OFF) for 14 seconds.

<Recipe Change by Simultaneous Use of Complex Heat Sources-Improvement of Uniformity>

According to an embodiment, the recipe providing device may change a recipe to use a plurality of heating unit simultaneously so as to shorten a cooking time and uniformly heat the interior and exterior of a product. For example, when a bulky and thick frozen hamburger steak is heated with a single heat source, the cooking time is lengthened to increase the internal temperature of the product, causing an excessive increase in the surface temperature and dry of the product. Therefore, by heating the product by using a heat source that facilitates internal heating and a heat source that facilitates external heating at the same time in combination, it is possible to shorten the cooking time and uniformly heat the product, thereby improving the cooking quality. The recipe providing device may change a recipe to cook the product using a microwave capable of heating the interior of the product and steam capable of heating the surface of the product at the same time to reduce the cooking time.

When there is an additional heat source (for example, grill or hot air) in addition to the cooking apparatus (main heat source, microwave), that is, when the cooking apparatus has a function of performing heating with a combination of a microwave and another heat source, the recipe providing device may perform the following functions.

The recipe providing device may store information about a cooking apparatus including a microwave and various heat sources.

The recipe providing device may perform heating prediction for the cooking apparatus by comprehensively considering parameters of the cooking apparatus, for example, a food type and composition, dielectric constant, magnetic permeability, specific heat, thermal conductivity, density, electrical conductivity, or latent heat of phase change of a product to be cooked, a microwave output, a microwave control method, a grill output, a hot air heating output, characteristics of a circulation fan, the 3D internal structure of the cooking apparatus, or the like.

The prediction of heating may be performed to correspond to any combination of the number of outputs of microwaves capable of being configured and the number of outputs of additional heat sources (grills or hot air) capable of being configured. For example, when the number of outputs of microwaves capable of being configured is four (700 W, 450 W, 300 W, and 100 W) and the number of outputs of additional heat sources capable of being configured is three (1500 W, 1000 W, and 500 W), the prediction of heating may be performed for combinations of 4*3=12 heat sources.

A heating prediction system for each combination of heat sources is generated by performing machine learning (Multivariate linear regression) for a temperature distribution (Temp of Point) for each of points of a product to be cooked for a result of the prediction of heating, and the generated heating prediction system may be stored in the recipe providing device. The recipe providing device may change the recipe by selecting a result suitable for the cooking purpose from the stored heating prediction system, and provide the changed recipe to the cooking apparatus or the user terminal.

On the other hand, when the main heat source of the cooking apparatus is a grill or hot air, not a microwave, the recipe providing device may change the recipe by using the stored data on the grill or hot air oven. In this case, the data may include the three-dimensional (3D) structure of a cooking zone of the cooking apparatus, the material of the structure, the output of the grill, the output of the heat source that generates the hot air, and the fan characteristic (Fan Curve) of the internal fan structure that outputs the hot air.

The recipe providing device may change the recipe by referring to the average temperature, the minimum temperature, and the maximum temperature of a temperature distribution (Temp of Point) for each point of the product to be cooked with respect to the cooking apparatus using the microwave described above.

In this case, in the case of a grill or hot air oven, because heated air collides with the surface of a food and heat is transferred to the interior of the product, the prediction of heating may be performed considering variables such as the specific heat, thermal conductivity, and latent heat of phase change according to moisture content of the food to be heated. Heating prediction data for a grill or hot air may be expressed in the form of a temperature distribution for each point according to a heating time similar to Table 5, and may be stored in the recipe providing device.

<Recipe Change with Use of Sequence of Complex Heat Source-Texture Improvement>

In another embodiment, the recipe may be changed to use a plurality of heating unit in sequence such that the interior and exterior of the product are uniformly heated and the exterior has a crispy texture. In the case of cooking fried-type frozen food, it is required to raise the internal temperature sufficiently to be edible, but cook the food crisply such that the external surface is not dry or soggy. Therefore, by heating the product in a sequence in which a heat source that facilitates internal heating of the product is primarily used and a heat source capable of cooking the external surface of the product crisply is secondarily used, not only uniform heating of the product may be achieved but also the texture of the surface may be crispy, thus improving the cooking quality. For example, when only a microwave, which is a single heat source, is used to cook a frozen chicken, an excessive cooking time may be required to increase the internal temperature of the chicken, and it may be difficult to implement a crispy surface texture of the chicken. Accordingly, the recipe providing device may change a recipe so as to heat the chicken for a predetermined time with the microwave and then heat the chicken for a predetermined time with hot wires or a convection for a crispy surface texture.

<Recipe Change According to Cooking Purpose>

The recipe providing device according to an embodiment may be capable of changing a recipe according to a cooking purpose, and may also be capable of changing a recipe according to a set combination of cooking purposes.

For example, the cooking purpose may include a case in which the internal temperature is uniform as possible, a case in which the lowest/highest temperature should be above/below a certain temperature, a case in which the average cooking temperature should be above a certain temperature and the cooking time should be short, a case in which the surface temperature should be below a certain temperature because the surface of the product burns easily, a case in which the internal temperature of the product should be within a certain range even through the surface temperature of the product is increased, or the like.

When the internal temperature of the product needs to be as uniform as possible, a C.V. value for each time may be calculated for each combination based on a result of the heating prediction, and a cooking time range for each combination may be limited according to the target temperature range of a heated product. In this case, C.V. is a value obtained by dividing the standard deviation by the average, and the smaller the value, the smaller the deviation from the average temperature, so that the temperature distribution for each point of the product may be uniform.

When the lowest/highest temperature should be above/below a specific temperature, the recipe may be changed by selecting a time period in which the lowest temperature is included in the range based on the result of the heating prediction.

When the average cooking temperature should be above a certain temperature and the cooking time should be short, the recipe may be changed by calculating the average cooking time in time for each of combinations based on the results of the heating prediction and limiting a time region in which the calculated average cooking temperature is included in a target range.

When the surface temperature should be below a certain temperature because the surface of the product burns easily, the recipe may be changed by limiting the surface temperature according to characteristics of the product, classifying results of heating prediction for the points in the vicinity of the surface among temperature distributions for points with respect to each of combinations of heat sources according to time, and calculating a time range for each of combinations of heat sources, the time range matching a target temperature condition.

When the internal temperature of the product should be within a certain range even though the surface temperature of the product is high, the recipe may be changed by limiting the surface temperature according to characteristics of the product, calculating results of heating prediction for the points in the vicinity of the surface among temperature distributions for points with respect to each of combinations of heat sources according to time and selecting a range matching a target temperature condition based on the calculated results.

A combination for each purpose may be created with logical operators (and, or, nor, xor).

A table for comprehensive results of the heating prediction for the above-mentioned recipe change may be shown as Table 6.

TABLE 6

| ID | Vendor | Heat source | Output (W) | Turntable rotation RPM | Duty Cycle (s) | On time (s) | Heating time (s) | Point 1 | Point 2 | ... | Point 2328 | Point 2329 |
|---|---|---|---|---|---|---|---|---|---|---|---|---|
| 23AW700D | AEC | MW | 700 | 5 | 48 | 48 | 0 | −15.50 | −15.50 | ... | −15.50 | −15.50 |
| 23AW700D | AEC | MW | 700 | 5 | 48 | 48 | 1 | −14.46 | −14.55 | ... | −14.39 | −14.08 |
| 484823AW700D | AEC | MW | 700 | 5 | 48 | 48 | 2 | −14.06 | −14.25 | ... | −12.17 | −11.86 |
| 484834KS1000A | AEC | MW | 700 | 5 | 48 | 48 | 3 | −13.17 | −13.27 | ... | −11.90 | −11.49 |
| 23AW700D | AEC | MW | 700 | 5 | 48 | 48 | 4 | −12.32 | −12.40 | ... | −11.41 | −10.90 |
| 484823AW700D | AEC | MW | 700 | 5 | 48 | 48 | 5 | −11.69 | −11.84 | ... | −10.91 | −10.50 |
| 484823AW700D | AEC | MW | 700 | 5 | 48 | 48 | 6 | −11.46 | −11.57 | ... | −10.48 | −10.01 |
| 484823AW700D | AEC | MW | 700 | 5 | 48 | 48 | 7 | −11.01 | −11.16 | ... | −10.14 | −9.64 |
| 484823AW700D | AEC | MW | 700 | 5 | 48 | 48 | 8 | −10.71 | −10.92 | ... | −9.66 | −9.28 |
| 484823AW700D | AEC | MW | 700 | 5 | 48 | 48 | 9 | −10.23 | −10.33 | ... | −9.13 | −8.60 |
| 484823AW700D | AEC | MW | 700 | 5 | 48 | 48 | 10 | −9.88 | −10.00 | ... | −8.90 | −8.34 |
| 484823AW700D | AEC | MW | 700 | 5 | 48 | 48 | 11 | −9.69 | −9.80 | ... | −8.77 | −8.19 |
| 484823AW700D | AEC | MW | 700 | 5 | 48 | 48 | 12 | −9.47 | −9.62 | ... | −8.64 | −8.08 |
| 484823AW700D | AEC | MW | 700 | 5 | 48 | 48 | 13 | −9.34 | −9.47 | ... | −7.81 | −7.34 |
| 484823AW700D | AEC | MW | 700 | 5 | 48 | 48 | 14 | −8.99 | −9.20 | ... | −7.44 | −6.90 |
| 484823AW700D | AEC | MW | 700 | 5 | 48 | 48 | 15 | −8.86 | −9.07 | ... | −6.59 | −6.16 |
| 484823AW700D | AEC | MW | 700 | 5 | 48 | 48 | 16 | −8.59 | −8.76 | ... | −6.13 | −5.57 |
| 484823AW700D | AEC | MW | 700 | 5 | 48 | 48 | 17 | −8.28 | −8.48 | ... | −5.95 | −5.36 |
| 484823AW700D | AEC | MW | 700 | 5 | 48 | 48 | 18 | −8.09 | −8.23 | ... | −5.51 | −4.99 |
| 484823AW700D | AEC | MW | 700 | 5 | 48 | 48 | 19 | −7.56 | −7.77 | ... | −4.87 | −4.39 |
| 23AW700D | AEC | MW | 700 | 5 | 48 | 48 | 20 | −7.28 | −7.51 | ... | −4.59 | −4.20 |
| 4848484823AW700D | AEC | MW | 700 | 5 | 48 | 48 | 21 | −6.77 | −7.06 | ... | −4.31 | −3.89 |
| 484823AW700D | AEC | MW | 700 | 5 | 48 | 48 | 22 | −6.64 | −6.96 | ... | −4.15 | −3.80 |
| 484823AW700D | AEC | MW | 700 | 5 | 48 | 48 | 23 | −6.28 | −6.53 | ... | −4.10 | −3.74 |
| 484823AW700D | AEC | MW | 700 | 5 | 48 | 48 | 24 | −5.93 | −6.19 | ... | −4.03 | −3.68 |
| 484823AW700D | AEC | MW | 700 | 5 | 48 | 48 | 25 | −5.77 | −6.10 | ... | −2.98 | −3.04 |
| 484823AW700D | AEC | MW | 700 | 5 | 48 | 48 | 26 | −4.79 | −4.80 | ... | −2.75 | −2.74 |
| 484823AW700D | AEC | MW | 700 | 5 | 48 | 48 | 27 | −4.56 | −4.73 | ... | −2.47 | −2.55 |
| 484823AW700D | AEC | MW | 700 | 5 | 48 | 48 | 28 | −4.36 | −4.51 | ... | −2.38 | −2.43 |
| 484823AW700D | AEC | MW | 700 | 5 | 48 | 48 | 29 | −4.13 | −4.28 | ... | −2.23 | −2.30 |
| 484823AW700D | AEC | MW | 700 | 5 | 48 | 48 | 30 | −4.12 | −4.20 | ... | −2.12 | −2.15 |
| 484823AW700D | AEC | MW | 700 | 5 | 48 | 48 | 31 | −3.42 | −3.42 | ... | −2.02 | −2.03 |
| 484823AW700D | AEC | MW | 700 | 5 | 48 | 48 | 32 | −3.39 | −3.39 | ... | −1.74 | −1.87 |
| 484823AW700D | AEC | MW | 700 | 5 | 48 | 48 | 33 | −3.04 | −3.08 | ... | −1.46 | −1.56 |
| 484823AW700D | AEC | MW | 700 | 5 | 48 | 48 | 34 | −3.01 | −3.06 | ... | −1.41 | −1.51 |
| 484823AW700D | AEC | MW | 700 | 5 | 48 | 48 | 35 | −2.82 | −2.84 | ... | −1.40 | −1.47 |
| 484823AW700D | AEC | MW | 700 | 5 | 48 | 48 | 36 | −2.73 | −2.73 | ... | −1.36 | −1.44 |
| 484823AW700D | AEC | MW | 700 | 5 | 48 | 48 | 37 | −2.67 | −2.71 | ... | −0.55 | −0.92 |
| 484823AW700D | AEC | MW | 700 | 5 | 48 | 48 | 38 | −2.33 | −2.33 | ... | −0.34 | −0.62 |
| 484823AW700D | AEC | MW | 700 | 5 | 48 | 48 | 39 | −2.31 | −2.33 | ... | 0.21 | −0.25 |
| 484823AW700D | AEC | MW | 700 | 5 | 48 | 48 | 40 | −2.18 | −2.21 | ... | 0.54 | 0.17 |
| 484823AW700D | AEC | MW | 700 | 5 | 48 | 48 | 41 | −2.05 | −2.09 | ... | 1.26 | 0.58 |
| 484823AW700D | AEC | MW | 700 | 5 | 48 | 48 | 42 | −2.05 | −2.06 | ... | 1.79 | 1.05 |
| 484823AW700D | AEC | MW | 700 | 5 | 48 | 48 | 43 | −1.73 | −1.73 | ... | 2.51 | 1.60 |
| 484823AW700D | AEC | MW | 700 | 5 | 48 | 48 | 44 | −1.71 | −1.71 | ... | 5.00 | 2.36 |
| 484823AW700D | AEC | MW | 700 | 5 | 48 | 48 | 45 | −1.52 | −1.55 | ... | 7.51 | 5.09 |
| 484823AW700D | AEC | MW | 700 | 5 | 48 | 48 | 46 | −1.50 | −1.53 | ... | 7.72 | 5.69 |
| 484823AW700D | AEC | MW | 700 | 5 | 48 | 48 | 47 | −1.36 | −1.37 | ... | 7.63 | 6.13 |
| 484823AW700D | AEC | MW | 700 | 5 | 48 | 48 | 48 | −1.29 | −1.29 | ... | 7.83 | 6.54 |
| 484823AW700D | AEC | MW | 700 | 5 | 48 | 48 | 49 | −1.26 | −1.28 | ... | 14.31 | 11.27 |
| 484823AW700D | AEC | MW | 700 | 5 | 48 | 48 | 50 | −1.00 | −1.00 | ... | 15.22 | 13.20 |
| 484823AW700D | AEC | MW | 700 | 5 | 48 | 48 | 51 | −0.99 | −0.99 | ... | 17.43 | 15.18 |
| 484823AW700D | AEC | MW | 700 | 5 | 48 | 48 | 52 | −0.87 | −0.87 | ... | 18.01 | 16.32 |

TABLE 6-continued

| ID | Vendor | Heat source | Output (W) | Turntable rotation RPM | Duty Cycle (s) | On time (s) | Heating time (s) | Point 1 | Point 2 | . . . | Point 2328 | Point 2329 |
|---|---|---|---|---|---|---|---|---|---|---|---|---|
| 484823AW700D | AEC | MW | 700 | 5 | 48 | 48 | 53 | −0.74 | −0.72 | . . . | 19.06 | 17.46 |
| 484823AW700D | AEC | MW | 700 | 5 | 48 | 48 | 54 | −0.73 | −0.69 | . . . | 19.65 | 18.52 |
| 484823AW700D | AEC | MW | 700 | 5 | 48 | 48 | 55 | −0.35 | −0.23 | . . . | 20.48 | 19.69 |
| 484823AW700D | AEC | MW | 700 | 5 | 48 | 48 | 56 | −0.33 | −0.21 | . . . | 22.72 | 20.79 |
| 484823AW700D | AEC | MW | 700 | 5 | 48 | 48 | 57 | 0.01 | 0.14 | . . . | 25.30 | 23.75 |
| 484823AW700D | AEC | MW | 700 | 5 | 48 | 48 | 58 | 0.04 | 0.22 | . . . | 25.54 | 24.18 |
| 484823AW700D | AEC | MW | 700 | 5 | 48 | 48 | 59 | 0.53 | 1.10 | . . . | 25.49 | 24.53 |
| 484823AW700D | AEC | MW | 700 | 5 | 48 | 48 | 60 | 0.83 | 1.44 | . . . | 25.71 | 24.79 |
| 23AW700D | AEC | MW | 1000 | 5 | 48 | 48 | 0 | −15.50 | −15.50 | . . . | −15.50 | −15.50 |
| 484823AW700D | AEC | MW | 1000 | 5 | 48 | 48 | 1 | −14.19 | −14.24 | . . . | −13.89 | −13.65 |
| 484823AW700D | AEC | MW | 1000 | 5 | 48 | 48 | 2 | −13.47 | −13.58 | . . . | −10.91 | −10.59 |
| 484823AW700D | AEC | MW | 1000 | 5 | 48 | 48 | 3 | −12.60 | −12.56 | . . . | −10.45 | −10.03 |
| 484823AW700D | AEC | MW | 1000 | 5 | 48 | 48 | 4 | −11.47 | −11.46 | . . . | −9.66 | −9.15 |
| 484823AW700D | AEC | MW | 1000 | 5 | 48 | 48 | 5 | −10.66 | −10.80 | . . . | −9.13 | −8.57 |
| 484823AW700D | AEC | MW | 1000 | 5 | 48 | 48 | 6 | −10.30 | −10.46 | . . . | −8.58 | −7.80 |
| 484823AW700D | AEC | MW | 1000 | 5 | 48 | 48 | 7 | −10.12 | −10.27 | . . . | −8.23 | −7.26 |
| 484823AW700D | AEC | MW | 1000 | 5 | 48 | 48 | 8 | −9.85 | −10.00 | . . . | −7.29 | −6.65 |
| 484823AW700D | AEC | MW | 1000 | 5 | 48 | 48 | 9 | −9.43 | −9.57 | . . . | −6.58 | −5.79 |
| 484823AW700D | AEC | MW | 1000 | 5 | 48 | 48 | 10 | −9.30 | −9.48 | . . . | −6.36 | −5.58 |
| 484823AW700D | AEC | MW | 1000 | 5 | 48 | 48 | 11 | −9.14 | −9.31 | . . . | −6.18 | −5.37 |
| 484823AW700D | AEC | MW | 1000 | 5 | 48 | 48 | 12 | −8.72 | −9.01 | . . . | −6.03 | −5.22 |
| 484823AW700D | AEC | MW | 1000 | 5 | 48 | 48 | 13 | −8.60 | −8.81 | . . . | −4.51 | −4.16 |
| 484823AW700D | AEC | MW | 1000 | 5 | 48 | 48 | 14 | −7.65 | −7.85 | . . . | −4.13 | −3.71 |
| 484823AW700D | AEC | MW | 1000 | 5 | 48 | 48 | 15 | −7.05 | −7.46 | . . . | −3.47 | −3.34 |
| 484823AW700D | AEC | MW | 1000 | 5 | 48 | 48 | 16 | −6.72 | −6.97 | . . . | −3.25 | −3.09 |
| 484823AW700D | AEC | MW | 1000 | 5 | 48 | 48 | 17 | −6.18 | −6.50 | . . . | −3.06 | −2.90 |
| 484823AW700D | AEC | MW | 1000 | 5 | 48 | 48 | 18 | −5.98 | −6.01 | . . . | −2.79 | −2.66 |
| 484823AW700D | AEC | MW | 1000 | 5 | 48 | 48 | 19 | −4.13 | −3.95 | . . . | −2.59 | −2.49 |
| 484823AW700D | AEC | MW | 1000 | 5 | 48 | 48 | 20 | −4.09 | −3.90 | . . . | −2.17 | −2.25 |
| 484823AW700D | AEC | MW | 1000 | 5 | 48 | 48 | 21 | −3.41 | −3.35 | . . . | −1.78 | −1.82 |
| 484823AW700D | AEC | MW | 1000 | 5 | 48 | 48 | 22 | −3.37 | −3.31 | . . . | −1.71 | −1.75 |
| 484823AW700D | AEC | MW | 1000 | 5 | 48 | 48 | 23 | −3.07 | −2.97 | . . . | −1.69 | −1.71 |
| 484823AW700D | AEC | MW | 1000 | 5 | 48 | 48 | 24 | −2.92 | −2.80 | . . . | −1.62 | −1.66 |
| 484823AW700D | AEC | MW | 1000 | 5 | 48 | 48 | 25 | −2.82 | −2.77 | . . . | −0.48 | −0.95 |
| 484823AW700D | AEC | MW | 1000 | 5 | 48 | 48 | 26 | −2.28 | −2.16 | . . . | −0.14 | −0.47 |
| 484823AW700D | AEC | MW | 1000 | 5 | 48 | 48 | 27 | −2.24 | −2.15 | . . . | 1.11 | 0.23 |
| 484823AW700D | AEC | MW | 1000 | 5 | 48 | 48 | 28 | −2.06 | −1.98 | . . . | 1.94 | 0.88 |
| 484823AW700D | AEC | MW | 1000 | 5 | 48 | 48 | 29 | −1.89 | −1.81 | . . . | 3.51 | 1.45 |
| 484823AW700D | AEC | MW | 1000 | 5 | 48 | 48 | 30 | −1.88 | −1.77 | . . . | 4.54 | 2.51 |
| 484823AW700D | AEC | MW | 1000 | 5 | 48 | 48 | 31 | −1.44 | −1.30 | . . . | 5.71 | 4.05 |
| 484823AW700D | AEC | MW | 1000 | 5 | 48 | 48 | 32 | −1.41 | −1.28 | . . . | 9.23 | 5.91 |
| 484823AW700D | AEC | MW | 1000 | 5 | 48 | 48 | 33 | −1.15 | −1.04 | . . . | 12.57 | 9.96 |
| 484823AW700D | AEC | MW | 1000 | 5 | 48 | 48 | 34 | −1.12 | −1.01 | . . . | 12.78 | 10.72 |
| 484823AW700D | AEC | MW | 1000 | 5 | 48 | 48 | 35 | −0.91 | −0.73 | . . . | 12.65 | 11.30 |
| 484823AW700D | AEC | MW | 1000 | 5 | 48 | 48 | 36 | −0.80 | −0.58 | . . . | 12.94 | 11.79 |
| 484823AW700D | AEC | MW | 1000 | 5 | 48 | 48 | 37 | −0.75 | −0.56 | . . . | 21.95 | 18.23 |
| 484823AW700D | AEC | MW | 1000 | 5 | 48 | 48 | 38 | −0.27 | 0.30 | . . . | 23.38 | 20.89 |
| 484823AW700D | AEC | MW | 1000 | 5 | 48 | 48 | 39 | −0.24 | 0.36 | . . . | 27.13 | 23.85 |
| 484823AW700D | AEC | MW | 1000 | 5 | 48 | 48 | 40 | 0.10 | 1.10 | . . . | 28.11 | 25.63 |
| 484823AW700D | AEC | MW | 1000 | 5 | 48 | 48 | 41 | 0.70 | 2.14 | . . . | 30.05 | 27.55 |
| 484823AW700D | AEC | MW | 1000 | 5 | 48 | 48 | 42 | 0.77 | 2.27 | . . . | 30.99 | 29.41 |
| 484823AW700D | AEC | MW | 1000 | 5 | 48 | 48 | 43 | 3.65 | 5.00 | . . . | 32.56 | 31.71 |
| 484823AW700D | AEC | MW | 1000 | 5 | 48 | 48 | 44 | 3.76 | 4.98 | . . . | 36.14 | 33.60 |
| 484823AW700D | AEC | MW | 1000 | 5 | 48 | 48 | 45 | 5.98 | 6.29 | . . . | 40.07 | 38.45 |
| 484823AW700D | AEC | MW | 1000 | 5 | 48 | 48 | 46 | 6.12 | 6.44 | . . . | 40.36 | 39.10 |
| 484823AW700D | AEC | MW | 1000 | 5 | 48 | 48 | 47 | 8.30 | 8.52 | . . . | 40.36 | 39.72 |
| 484823AW700D | AEC | MW | 1000 | 5 | 48 | 48 | 48 | 8.96 | 9.16 | . . . | 40.60 | 39.96 |
| 484823AW700D | AEC | MW | 1000 | 5 | 48 | 48 | 49 | 9.36 | 9.11 | . . . | 51.72 | 47.65 |
| 484823AW700D | AEC | MW | 1000 | 5 | 48 | 48 | 50 | 12.42 | 11.99 | . . . | 52.79 | 50.30 |
| 484823AW700D | AEC | MW | 1000 | 5 | 48 | 48 | 51 | 12.55 | 12.07 | . . . | 56.62 | 53.69 |
| 484823AW700D | AEC | MW | 1000 | 5 | 48 | 48 | 52 | 13.82 | 13.35 | . . . | 57.28 | 55.27 |
| 484823AW700D | AEC | MW | 1000 | 5 | 48 | 48 | 53 | 15.16 | 14.87 | . . . | 59.09 | 57.01 |
| 484823AW700D | AEC | MW | 1000 | 5 | 48 | 48 | 54 | 15.16 | 15.14 | . . . | 59.78 | 58.50 |
| 484823AW700D | AEC | MW | 1000 | 5 | 48 | 48 | 55 | 19.06 | 18.81 | . . . | 61.54 | 60.77 |
| 484823AW700D | AEC | MW | 1000 | 5 | 48 | 48 | 56 | 19.12 | 18.98 | . . . | 64.30 | 62.10 |
| 484823AW700D | AEC | MW | 1000 | 5 | 48 | 48 | 57 | 21.75 | 20.78 | . . . | 67.53 | 66.00 |
| 484823AW700D | AEC | MW | 1000 | 5 | 48 | 48 | 58 | 21.76 | 21.00 | . . . | 67.79 | 66.47 |
| 484823AW700D | AEC | MW | 1000 | 5 | 48 | 48 | 59 | 24.12 | 23.73 | . . . | 67.88 | 67.07 |
| 23AW700D | AEC | MW | 1000 | 5 | 48 | 48 | 60 | 24.54 | 24.33 | . . . | 67.89 | 67.13 |

<Recipe Change to Improve Cooking Quality-Texture, Flavor, or the Like>

According to an embodiment, the recipe providing device may change a recipe in consideration of the texture or flavor of a food. The recipe providing device may change the recipe according to the user's selection (e.g., selection of crispy texture or moist texture), and change the recipe according to the type of a product to be cooked (e.g., it is preferred that steak has a juicy texture). For example, the recipe providing device may change the recipe to heat a food using a microwave in the first half of cooking period for a crispy texture, and heat the food using a hot wire or convection in the second half of the cooking period.

As another example, the recipe providing device may change the recipe to heat a food using a microwave in the first half of cooking period for a crispy texture, and heat the food using steam in the second half of the cooking period.

As another example, the recipe providing device may change the recipe to heat a food with a high temperature using a hot wire or convection in the first half of cooking period for a juicy texture, and heat the food using infrared or microwave in the second half of the cooking period.

<Recipe change to Improve Cooking Quality-Temperature Control>

When a cooking time and a temperature variation are minimized, loss of flavor of food due to heat may be minimized. The recipe providing device may change the recipe to minimize the cooking time and the temperature variation by appropriately utilizing a microwave, infrared, a grill, and a convection. Specifically, a low-temperature section in which flavor loss easily occurs and a high-temperature section in which flavor loss does not occur relatively may be defined, and a critical temperature therebetween may be defined as a first threshold. The recipe change according to the present disclosure may be performed to cook a food using an MW heat source and an infrared heat source simultaneously or in sequence such that the internal temperature of the food quickly reaches a first threshold to minimize flavor loss and, after the first threshold has been reached (flavor loss does not occur easily), then cook the food using a heat source with a relatively low increase rate of temperature, such as a grill or convection such that the temperature variation of the product is not severe. The first threshold may be variously determined depending on the type, shape, and composition of a food, but in general, may be determined between 40° C. and 60° C., and a person skilled in the art may calculate a first threshold suitable for each food/product/composition and create a database for first thresholds.

<Recipe Change to Improve Cooking Quality-Induction of Flavor Reaction>

By intentionally raising the cooking temperature by 20 to 30 degrees compared to a basic recipe, the recipe may be changed such that the flavor reaction of a food, such as the caramelization reaction and the Maillard reaction, occurs. A person skilled in the art will be able to create a database by acquiring a suitable temperature rise condition and a suitable cooking time such that the intended flavor reaction occurs for each food/product/composition.

<Recipe Change According to User Feedback>

According to an embodiment, the recipe providing device may change a recipe based on a user's feedback. For example, the recipe providing device may maintain a current recipe changing algorithm when positive feedback is received from the user. The recipe providing device may modify the recipe changing algorithm when negative feedback is received from the user. The recipe providing device may receive feedback through the cooking apparatus. The cooking apparatus may provide a user interface for receiving feedback from a user. The user interface may be configured to receive comments associated with a cooking mode.

For example, when a crispy mode is selected when cooking a product to be cooked, the cooking apparatus may output a user interface for allowing a user to request an increase or decrease in crispy texture of the cooked product. As another example, when a soft mode is selected when cooking a product to be cooked, the cooking apparatus may output a user interface for allowing a user to request an increase or decrease in soft texture of the cooked product. When feedback is received through the user interface, the recipe providing device may modify a recipe change criterion. For example, when an increase in crispy texture is requested by the user, the recipe providing device may modify the recipe changing algorithm to increase a cooking time or temperature by convection for the crispy texture. As another example, when feedback indicating that the soft texture is insufficient is received from the user, the recipe providing device may modify the recipe changing algorithm to increase a discharge amount of steam. As another example, the recipe providing device may allow the user to directly modify the recipe changing algorithm (e.g., change a heating unit, a heating time, a heating temperature, or the like).

According to an embodiment, the recipe providing device may recommend a product to a user based on a recipe provision history. For example, the recipe providing device may recommend, for example, a user's preferred product and a product related to the preferred product based on the recipe provision history.

Figure 7:
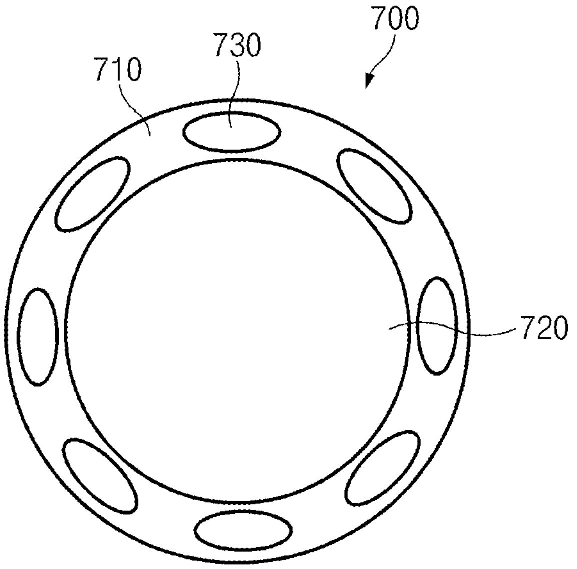
FIG. 7 illustrates an exemplary method of guiding a heating point in a cooking apparatus according to an embodiment.

FIG. 7 illustrates an exemplary method of guiding a heating point in a cooking apparatus according to an embodiment.

Referring to FIG. 7, a cooking apparatus according to an embodiment may include a turntable 700 therein. When the cooking apparatus is a microwave oven, the heating rate of an annular peripheral region 710 in the turntable 700 may be high depending on the type and/or characteristics of the cooking apparatus. The cooking apparatus may guide the user to place a product to be cooked 730 in the peripheral region 710 with a high heating rate. The cooking apparatus may provide guidance for the peripheral region 710 according to pre-stored information or may provide guidance for the peripheral region 710 according to information received from the recipe providing device. The cooking apparatus may operate a light to illuminate the peripheral region 710 of the turntable 700, for example, using the output device 550 (shown in FIG. 5), and may output voice guidance or text guidance. In addition, a display may be provided in the cooking apparatus as the output device 550, so that a position at which the product to be cooked 730 is to be arranged on the turntable 700 may be displayed on the display. The user may place the product to be cooked 730 in the peripheral region 710 according to the guidance of the cooking apparatus. Although not shown in FIG. 7, when it is necessary to slowly heat the product to be cooked 730 according to the characteristics of the product to be cooked 730, guidance may be provided to allow the user to place the product to be cooked 730 in a central region 720 having a slow heating rate.

Figure 8:
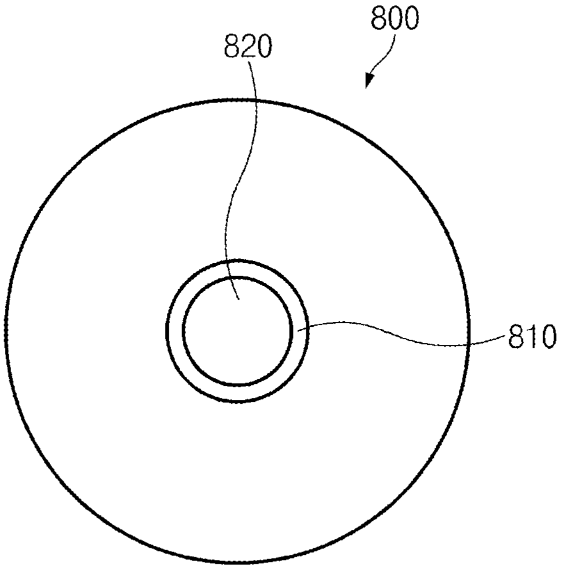
FIG. 8 illustrates an exemplary method of providing guidance for a heating position in a cooking apparatus according to an embodiment.

FIG. 8 illustrates an exemplary method of providing guidance for a heating position in a cooking apparatus according to an embodiment.

Referring to FIG. 8, a cooking apparatus according to an embodiment may include a turntable 800 therein. The heating rate of a central region 810 in the turntable 800 may be high according to the characteristics of the cooking apparatus. The cooking apparatus may guide the user to place a product to be cooked 820 in the central region 810 having a high heating rate. The cooking apparatus may provide guidance for the central region 810 according to pre-stored information, or may provide guidance for the central region 810 according to information received from the recipe providing device. The cooking apparatus may operate a light to illuminate the central region 810, for example, and may output voice guidance or text guidance. The user may place the product to be cooked 820 in the central region 810 according to the guidance of the cooking apparatus.

The cooking apparatus may provide guidance for the central region 810 of the turntable with a light using the output device 550 (shown in FIG. 5), may provide voice guidance using a speaker, and may provide text guidance or mark a position where the product to be cooked 820 is to be placed using a display.

The calculation of the position of the product to be cooked and the provision of guidance in the cooking apparatus as shown in FIGS. 7 and 8 will be described in more detail as follows.

The recipe providing device may calculate an optimal position of a product to be cooked which is to be disposed in a cooking apparatus according to a cooking purpose, and provide the calculated position information through an image or voice guidance of a user terminal (e.g., a smart phone), based on information on a combination of the cooking apparatus and the product to be cooked, it being requested by the user to provide information stored in the recipe providing device (e.g., server) (information on the cooking apparatus and the product to be cooked) and cooling guidance with respect to the combination.

The recipe providing device may perform heating prediction by synthetically considering the physicochemical properties, shape and composition of an object to be heated (for example, a product to be cooked), the type of a heat source, the shape of a cooking space inside a cooking apparatus, the output and control method of the cooking apparatus, and the like.

The position change for heating prediction may be classified as follows according to the characteristics of the cooking apparatus.

When a turntable is present, a product to be cooked may be arranged in units of a reference distance based on the distance from the rotational center of the turntable to the maximum radius of the turntable. For example, when the maximum radius of the turntable is 150 mm and the maximum radius of the product to be cooked is 50 mm, the product to be cooked may be positioned in the units of 15 mm (in unit of a reference distance) from the center of the turntable. In more detail, the distance from the center of the turntable to the center of the product to be cooked may be 0 mm. In this case, it is a case where the center of the product to be cooked is located at the rotational center of the turntable. In addition, the product to be cooked may be positioned on the turntable such that the distance from the center of the turntable to the center of the product to be cooked is 15 mm, 30 mm, 45 mm, 60 mm, 75 mm, or 90 mm. The unit of reference distance may be changed in consideration of the unit of the reference distance unit recognizable by the user.

When a product to be cooked (e.g., an object to be heated) does not have an axially symmetrical shape (non-circular shape, various free shapes, or the like), the product to be cooked may be positioned in consideration of the degree of rotation of the product to be cooked in the unit of 90 degree.

When the product to be cooked has an axially symmetrical shape, it may be assumed that the number of angles at which the product to be cooked is capable of being positioned is one because the product to be cooked has the same shape even though the product to be cooked is arbitrarily rotated while the distance from the rotational center of the turntable is set. That is, when the product to be cooked has a square shape, it may be assumed that the number of angles at which the product to be cooked is capable of being positioned is one because the product to be cooked has the same shape even though the product to be cooked is arbitrarily rotated. When the product to be cooked has a rectangular shape, it may be assumed that the number of angles at which the product to be cooked is capable of being positioned is two because the product has the same shape in the case of 90 degree rotation and 270 degree rotation and in the case of 0 degree rotation and 180 degree rotation. When the product to be cooked has a free shape, it may be assumed that the number of angles at which the product to be cooked is capable of being positioned is four including 0 degree, 90 degrees, 180 degrees, and 270 degrees.

When heating prediction is performed, results of heating prediction in one, two, and four rotation cases may all be generated according to the shape of the product to be cooked.

When there is no turntable or an auxiliary device for forcibly moving a product to be cooked, the positional distance of the product to be cooked forward/backward/left and right from the center of the internal volume of the cooking space of the cooking apparatus may be determined to be a preset reference distance (25 mm). For example, when the internal volume of the cooking space is 300 mm*200 mm and the size of a product to be cooked is 100 mm*50 mm, the center of the product to be cooked may be positioned at (−100 mm, −75 mm), (−100, −50), (−100, −25), (−100, 0), (−100, 25), (−100, 50), (−100, 75), (−75, −75), (−75, −50), (−75, −25), (−75, 0), (−75, 25), (−75, 50), (−75, 75), (−50, −75) to (100, 0), (100, 25), (100, 50), (100, 75).

Therefore, in a case in which heating prediction is performed, when a turntable or an auxiliary device for moving a product to be cooked is absent in the cooking apparatus, results of heating prediction may be generated for any combination of positions at which the product to be cooked is positioned in the cooking space at reference distances according to the internal volume of the cooking space and the size of the product to be cooked When the cooking apparatus is provided with a height adjustment guide and a ferrite plate or the like, heating prediction may be performed on combinations of positions related to the presence or absence of the turntable, rotations of the turntable, and the increase in height.

For example, when there are three conditions of a base height (e.g., floor) and a 50 mm height guide, a 100 mm height guide in the case where the cooking apparatus is an oven, the heating prediction may be performed by assuming positions on which heating prediction is to be performed in addition to combinations of front-rear/left-right/rotations.

When the cooking apparatus uses a microwave, the combination of positions of the product to be cooked may be limited according to the cooking purpose by predicting the electromagnetic field strength and distribution of the empty cooking space of the cooking apparatus. For example, in the case of a cooking apparatus using a microwave, the electromagnetic field strength and distribution during idling may be predicted for each distance from a rotational center while taking into account the radius of the product to be cooked. When the cooking purpose is to heat the product at high speed, heating prediction may be performed in consideration of only the rotation radius before/after a place where the electromagnetic field distribution is strongest. More specifically, when the diameter of the product to be cooked is 50 mm and the diameter of the turntable is 150 mm, the intensity and distribution of the electromagnetic field may be predicted by dividing the turntable into 6 equal parts, and when the fifth part among the six divided parts is the part where the electromagnetic field strength meets the cooking purpose, heating prediction may be performed only on the fourth, fifth, and sixth parts.

As described above, the results of heating prediction at the calculated position may be implemented in Table 7 with the following table format. In this case, the form of the heating prediction result may have an equation, a regression equation, a three-dimensional array, various image types, and the like other than a table.

TABLE 7

| ID | VENDOR | HEAT SOURCE | OUPPUT (W) | TURN-TABLE ROTION RPM | Duty Cycle (s) | On time (s) | Shifted Distance from Center (mm) | HEATING TIME (S) | Point 1 | Point 2 | . . . | Point 2186 | Point 2187 |
|---|---|---|---|---|---|---|---|---|---|---|---|---|---|
| 23AW700D | AEC | MW | 700 | 5 | 30 | 30 | 0 | 0 | −15.50 | −15.50 | . . . | −15.50 | −15.50 |
| 23AW700D | AEC | MW | 700 | 5 | 30 | 30 | 0 | 1 | −13.71 | −13.13 | . . . | −14.32 | −14.28 |
| . . . | . . . | . . . | . . . | . . . | . . . | . . . | . . . | . . . | . . . | . . . | . . . | . . . | . . . |
| 23AW700D | AEC | MW | 700 | 5 | 30 | 30 | 0 | 179 | 89.96 | 90.84 | . . . | 51.98 | 51.79 |
| 23AW700D | AEC | MW | 700 | 5 | 30 | 30 | 0 | 180 | 89.99 | 90.89 | . . . | 53.30 | 52.86 |
| 23AW700D | AEC | MW | 700 | 5 | 30 | 30 | 15 | 0 | −15.50 | −15.50 | . . . | −15.50 | −15.50 |
| 23AW700D | AEC | MW | 700 | 5 | 30 | 30 | 15 | 1 | −14.20 | −14.17 | . . . | −13.44 | −13.40 |
| . . . | . . . | . . . | . . . | . . . | . . . | . . . | . . . | . . . | . . . | . . . | . . . | . . . | . . . |
| 23AW700D | AEC | MW | 700 | 5 | 30 | 30 | 15 | 179 | 85.85 | 86.94 | . . . | 62.00 | 62.72 |
| 23AW700D | AEC | MW | 700 | 5 | 30 | 30 | 15 | 180 | 85.95 | 87.10 | . . . | 63.68 | 63.91 |
| 23AW700D | AEC | MW | 700 | 5 | 30 | 30 | 30 | 0 | −15.50 | −15.50 | . . . | −15.50 | −15.50 |
| 23AW700D | AEC | MW | 700 | 5 | 30 | 30 | 30 | 1 | −14.38 | −14.75 | . . . | −12.05 | −12.35 |
| . . . | . . . | . . . | . . . | . . . | . . . | . . . | . . . | . . . | . . . | . . . | . . . | . . . | . . . |
| 23AW700D | AEC | MW | 700 | 5 | 30 | 30 | 30 | 179 | 91.11 | 91.75 | . . . | 86.70 | 86.40 |
| 23AW700D | AEC | MW | 700 | 5 | 30 | 30 | 30 | 180 | 91.26 | 91.94 | . . . | 86.85 | 86.48 |

The recipe providing device may provide a recipe to the cooking apparatus by selecting a result value matching the cooking purpose from among the heating prediction result values at the calculated positions.

Figure 9:
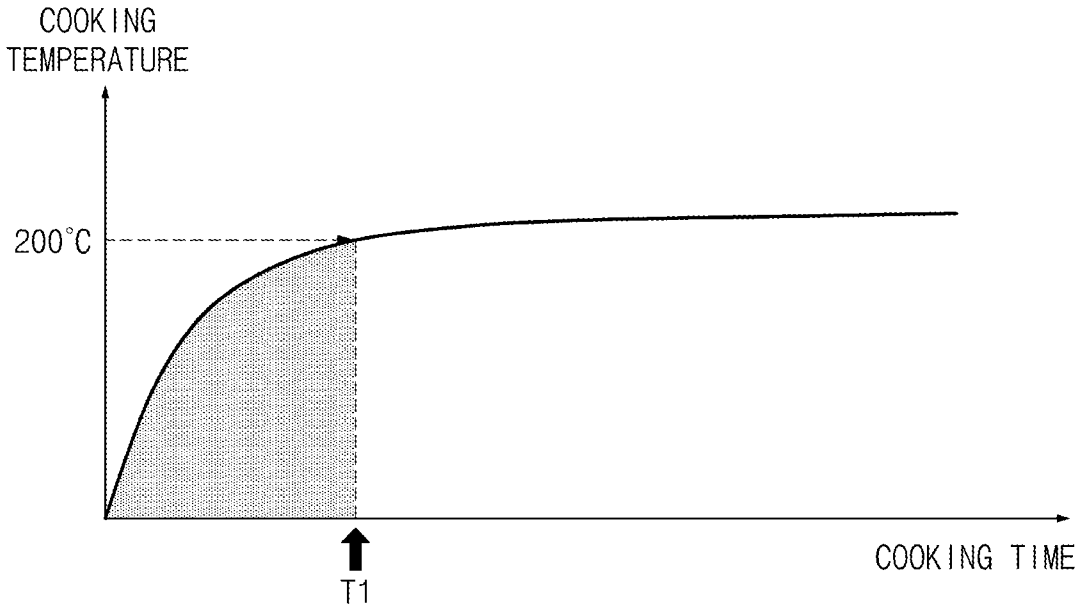
FIG. 9 is a graph showing a cooking temperature with time in a cooking apparatus according to an embodiment.

FIG. 9 is a graph showing a cooking temperature with time in a cooking apparatus according to an embodiment.

Referring to FIG. 9, it may be required to secure a sufficient cooking temperature according to the type of a product to be cooked. A preheating time may be required to secure a sufficient cooking temperature in the inside of the cooking apparatus. A recipe providing device may include a preheating phase in a recipe when a preheating time is required due to the characteristics of the product to be cooked and the characteristics of the cooking apparatus. For example, when a cooking temperature of 200° C. is required, the cooking apparatus may complete preheating to 200° C. according to a recipe (T1) and then output a notification indicating the completion of preheating to induce a user to input the product to be cooked.

Figure 10:
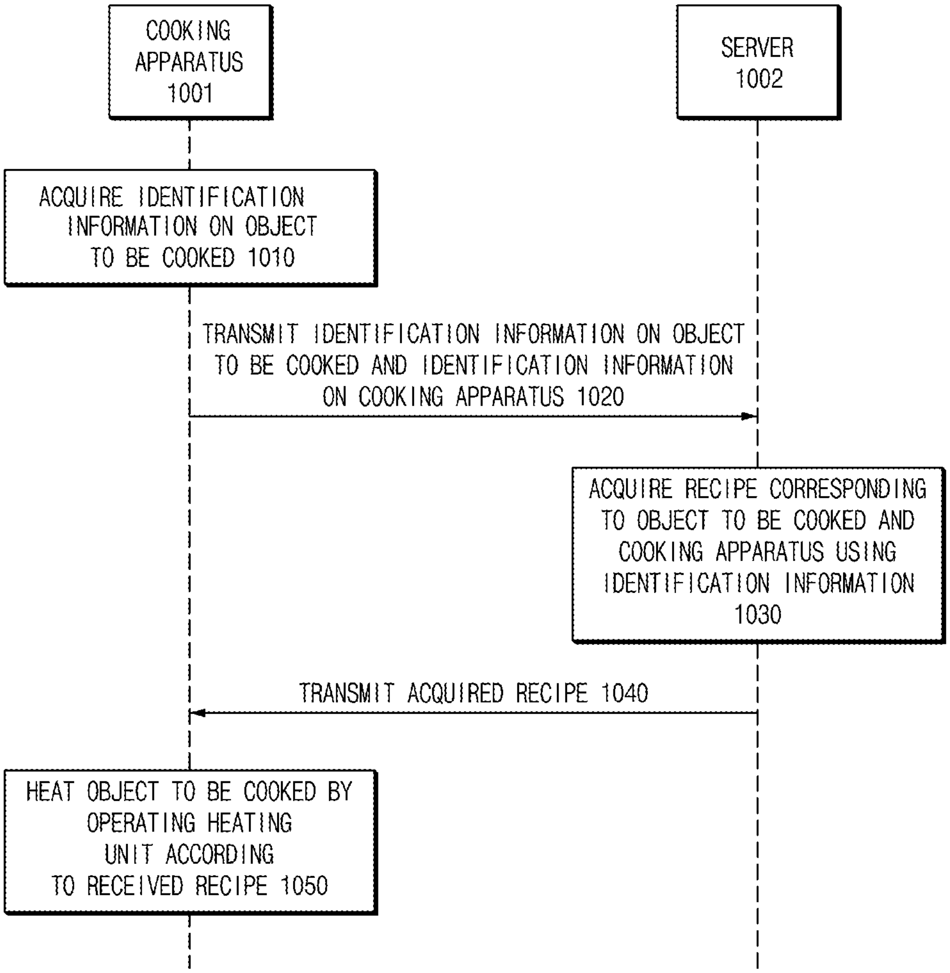
FIG. 10 is a flowchart of a recipe providing method according to an embodiment.

FIG. 10 is a flowchart of a recipe providing method according to an embodiment.

Referring to FIG. 10, in operation 1010, a cooking apparatus 1001 may acquire identification information on a product to be cooked. In operation 1020, the cooking apparatus 1001 may transmit the identification information on the product to be cooked and identification information on the cooking apparatus 1001 to a server 1002. The server 1002 may receive the identification information. In operation 1030, the server 1002 may acquire a recipe corresponding to the product to be cooked and the cooking apparatus 1001 using the identification information. In operation 1040, the server 1002 may transmit the acquired recipe to the cooking apparatus 1001. The cooking apparatus 1001 may receive the recipe. In operation 1050, the cooking apparatus 1001 may heat the product to be cooked by operating a heating unit according to the received recipe.

Figure 11:
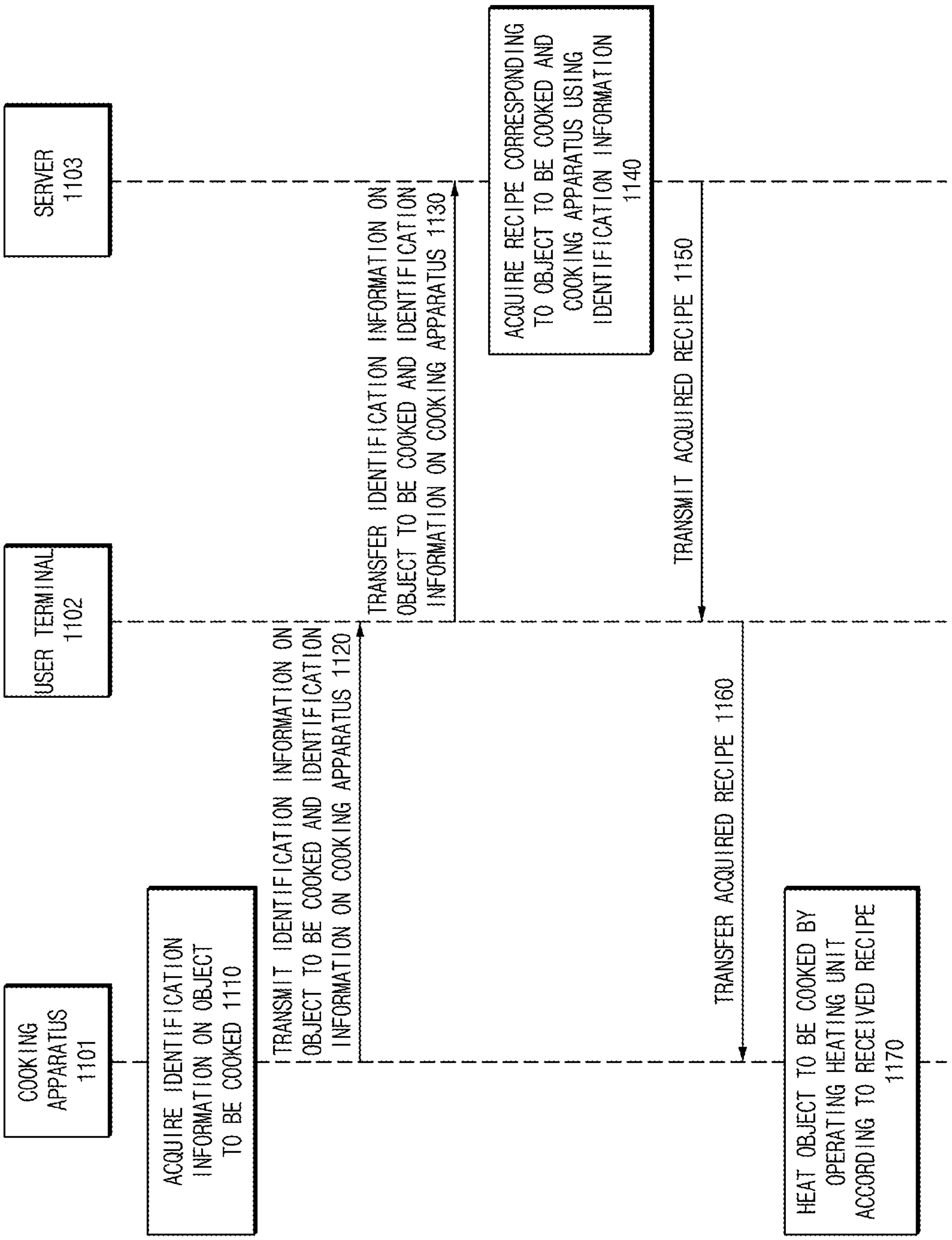
FIG. 11 is a flowchart of a recipe providing method according to an embodiment.

FIG. 11 is a flowchart of a recipe providing method according to an embodiment.

Referring to FIG. 11, in operation 1110, a cooking apparatus 1101 may acquire identification information on a product to be cooked. In operation 1120, the cooking apparatus 1101 may transmit the identification information on the product to be cooked and identification information on the cooking apparatus 1101 to a user terminal 1102. The user terminal 1102 may receive the identification information. In operation 1130, the user terminal 1102 may transmit the identification information to a server 1103. The server 1103 may receive the identification information. In operation 1140, the server 1103 may acquire a recipe corresponding to the product to be cooked and the cooking apparatus 1101 using the identification information. In operation 1150, the server 1103 may transmit the acquired recipe to the user terminal 1102. In operation 1160, the user terminal 1102 may transmit the acquired recipe to the cooking apparatus 1101. In operation 1170, the cooking apparatus 1101 may heat the product to be cooked by operating a heating unit according to the received recipe.

Figure 12:
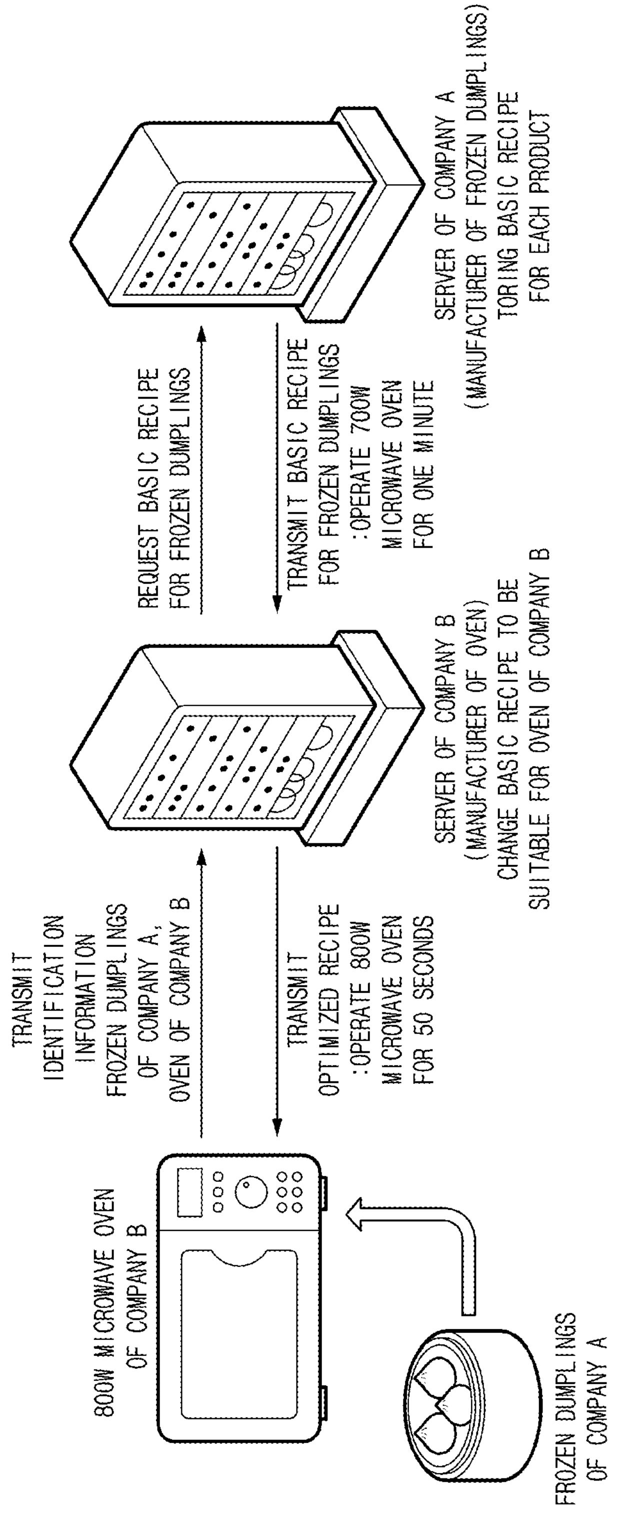
FIG. 12 is a diagram for describing an exemplary recipe provided by a recipe providing device according to an embodiment.

FIG. 12 is a diagram for describing an exemplary recipe provided by a recipe providing device according to an embodiment.

Referring to FIG. 12, a first server (e.g., a server of company B) according to an embodiment may receive identification information on a product to be cooked (e.g., frozen dumplings of company A) and a cooking apparatus from the cooking apparatus (e.g., 800 W microwave oven of company B). The first server may be, for example, a server of an oven vendor.

Because the first server does not have a basic recipe for an object to be cooked, the first server may acquire the basic recipe for the object to be cooked from the outside. For example, the first server may transmit identification information on the object to be cooked to a second server (e.g., a server of company A). The second server may be, for example, a server of a frozen dumpling manufacturer. The second server may acquire a basic recipe (e.g., operating a 700 W microwave oven for one minute) for frozen dumplings from a database stored in advance based on the identification information.

The second server may transmit the acquired basic recipe to the first server. The first server may change the basic recipe to be suitable for the cooking apparatus based on the identification information on the cooking apparatus. The first server may provide an optimized recipe (e.g., operating an 800 W microwave oven for 50 seconds) to the cooking apparatus. The cooking apparatus may heat the product to be cooked for 50 seconds using a microwave according to the provided recipe.

When there are first to fourth servers, the first server may store user information and history according to a combination of a cooking apparatus and a product to be cooked based on information recognized from the cooking apparatus, and request and return or transmit a quick cooking method from and to the second server based on the stored information.

The second server may receive the request of the first server and transmit a heat source combination/cooking time suitable for a cooking purpose to the first server when there is a result of heating prediction which has been completed or request heating prediction from the fourth server when the heating prediction is not completed, and the fourth server may return the heat source combinations/cooking time through machine learning (multi-variate linear regression) for similar combinations.

The third server may accumulate and store information on the cooking apparatus and the product to be cooked and provide the information to the fourth server.

The fourth server may receive a request from the second server and receive information on the cooking apparatus and the product to be cooked accumulated and stored in the third server, and may perform heating prediction. In this case, the first server may be a customer UX server, the second server may be an algorithm providing server, the third server may be a heating prediction physical property data server, and the fourth server may be a dedicated server for heating prediction analysis.

FIG. 13 is a diagram for describing an exemplary recipe provided by a recipe providing device according to an embodiment.

Referring to FIG. 13, a first server (e.g., a server of company B) according to an embodiment may receive a user preference recipe in addition to identification information on a product to be cooked (e.g., frozen dumplings of company A) and a cooking apparatus from the cooking apparatus (e.g., 800 W microwave oven of company B). The user preference may include, for example, requests such as uniform heating, shorter cooking time and/or improved cooking quality.

Because the first server does not have a basic recipe for an object to be cooked, the first server may acquire the basic recipe for the object to be cooked from the outside. For example, the first server may transmit the identification information on the object to be cooked and the user preference recipe to a second server (e.g., a server of company A). The second server may acquire a basic recipe of frozen dumplings (e.g., operate a 700 W microwave for 30 seconds and then operate a convection oven at 200° C. for 30 seconds), which is suitable for the user preference from a database stored in advance based on the acquired information.

The second server may transmit the basic recipe reflecting the user preference to the first server. The first server may change the basic recipe to be suitable for the cooking apparatus based on the identification information on the cooking apparatus. The first server may provide the optimized recipe to the cooking apparatus.

Figure 14:
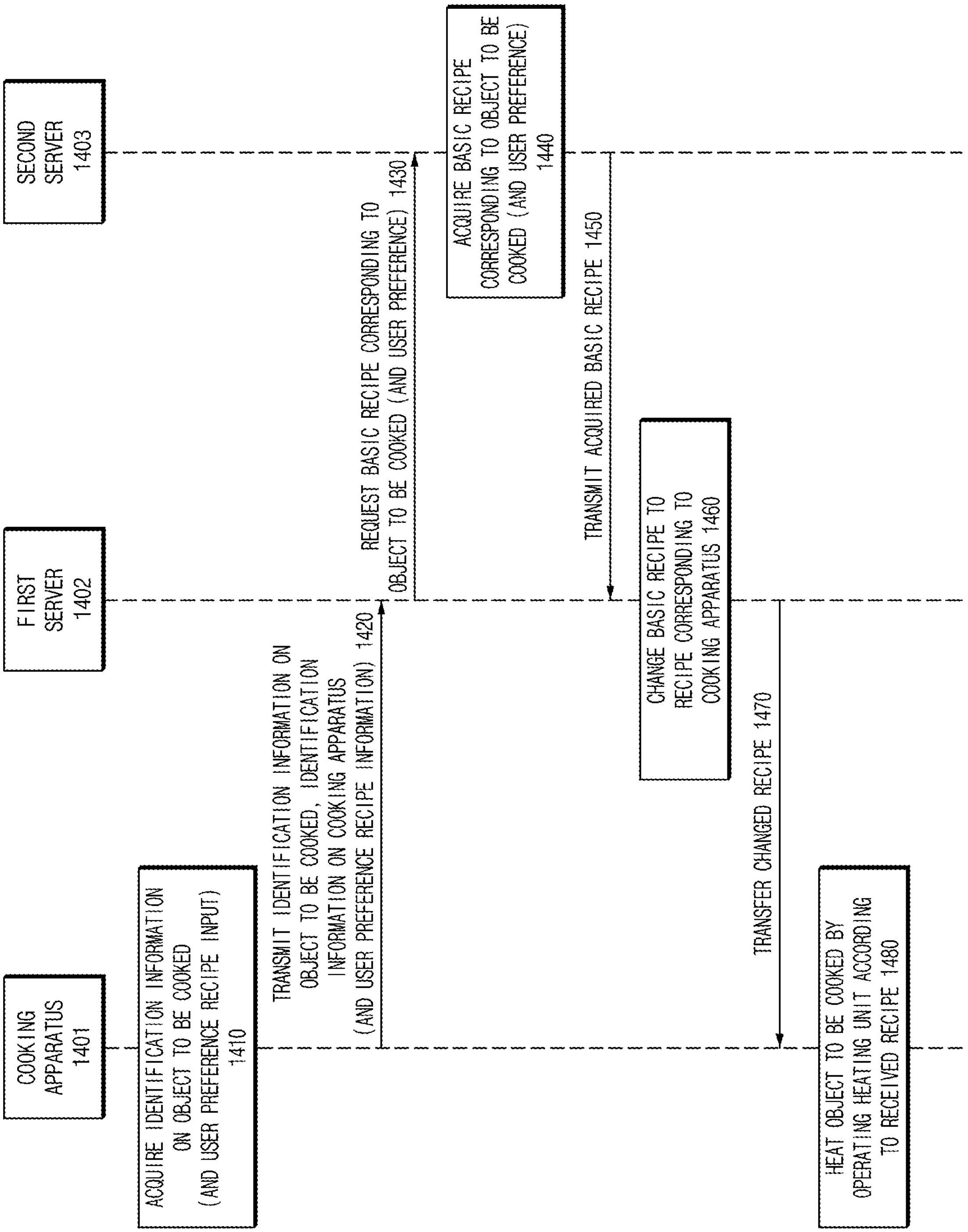
FIG. 14 is a flowchart of a recipe providing method according to an embodiment.

FIG. 14 is a flowchart of a recipe providing method according to an embodiment.

Referring to FIG. 14, in operation 1410, a cooking apparatus 1401 may acquire identification information on a product to be cooked (and a user preference recipe input). In operation 1420, the cooking apparatus 1401 may transmit the identification information on the product to be cooked and identification information on the cooking apparatus 1401 (and user preference recipe information) to a first server 1402. The first server 1402 may receive the information. In operation 1430, the first server 1402 may request a basic recipe corresponding to the product to be cooked (and the user preference) from a second server 1403. The second server 1403 may receive identification information (and user preference recipe information) on the product to be cooked. In operation 1440, the second server 1403 may acquire a basic recipe corresponding to the product to be cooked (and the user preference). In operation 1450, the second server 1403 may transmit the acquired basic recipe to the first server 1402. In operation 1460, the first server 1402 may change the basic recipe into a recipe corresponding to the cooking apparatus 1401. In operation 1470, the first server 1402 may transmit the changed recipe to the cooking apparatus 1401. In operation 1480, the cooking apparatus 1401 may heat the product to be cooked by operating a heating unit according to the received recipe.

FIG. 15 is a flowchart for describing operation of a recipe providing device according to an embodiment.

FIG. 15 may correspond to an operational flowchart of a recipe providing device, for example, a server as described above.

Referring to FIG. 15, a recipe providing device may store performance of a cooking apparatus and temperature data for each point of a product to be cooked (S10). In this case, the temperature data may be results of heating prediction for each point of the product to be cooked when the cooking apparatus heats the product to be cooked and may be represented in a table as shown in Table 3.

For example, the recipe providing device may store the temperature data for each point of the product according to the performance and heating time of a standard cooking apparatus. In this case, the cooking apparatus stored in the recipe providing device may be referred to as a standard cooking apparatus, and the performance of the standard cooking apparatus may include an output power, a usage age, the presence or absence of an output control device (inverter), and a type of a heat source.

The recipe providing device may compare performance information (output power, usage age, presence or absence of an output control device, and type of a heat source) of the user's cooking apparatus with the performance of a standard cooking apparatus stored in the recipe providing device (S20).

When the user's cooking apparatus is the same as the standard cooking apparatus stored in the recipe providing device, the recipe providing device may use the temperature data for each point of the product stored in the recipe providing device (S30).

On the other hand, when the user's cooking apparatus is different from the standard cooking apparatus stored in the recipe providing device, expected temperature data of the user's cooking apparatus (e.g., temperature data for each point of a product) may be generated using temperature data for each point of the product for the standard cooking apparatus, which is closest to the performance of the user's cooking apparatus (S40).

The recipe providing device may generate a recipe according to a cooking purpose based on the temperature data for each point of the product (S50). In this case, the cooking purpose may include uniform internal temperature of the product, specifying of lowest/highest temperature, specifying of average temperature and cooking time, maximum surface temperature value of the product, and the like, and the recipe providing device may generate a recipe according to a combination of cooking purposes.

The recipe providing device may provide the generated recipe to a cooking apparatus or user terminal of a user (S60) to enable cooking of a product according to the recipe.

Briefly describing a recipe providing method according to an embodiment of the present disclosure, the recipe providing method may include recognizing information on a product to be cooked and a cooking apparatus using a user terminal, transmitting the information recognized by the user terminal to a server, selecting, by the server, temperature data for each point of the product to be cooked for a cooking apparatus stored or learned in the server based on the recognized information, generating a recipe corresponding to a cooking purpose based on the selected temperature data, and transmitting the generated recipe to the cooking apparatus and the user terminal.

Figure 16:
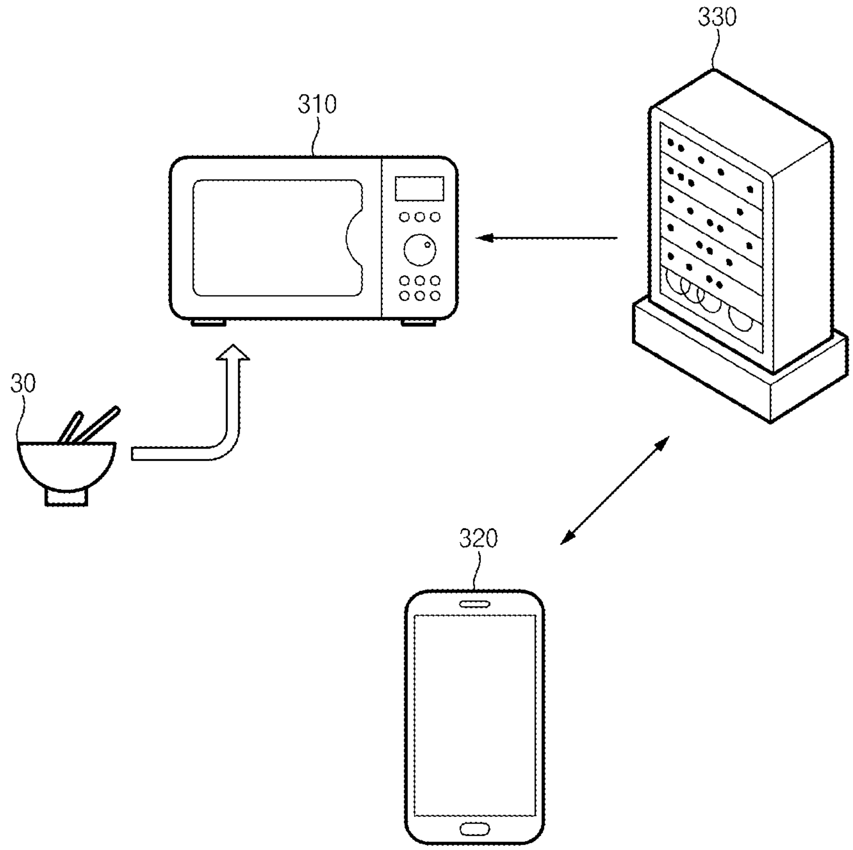
FIG. 16 illustrates a configuration of a recipe providing system according to another embodiment.

FIG. 16 illustrates a configuration of a recipe providing system according to another embodiment.

Referring to FIG. 16, a recipe providing system according to an embodiment may include the product to be cooked 30, the cooking apparatus 310, the user terminal 320, and the server 330.

The product to be cooked 30, the cooking apparatus 310, and the server 330 of FIG. 16 may correspond to the product to be cooked 20, the cooking apparatus 210, and the server 220 of FIG. 2, respectively.

According to another embodiment, the user terminal 320 may provide identification information on the cooking apparatus 310 and the product to be cooked 30 to the server 330.

The server 330 may generate a recipe based on the identification information on the cooking apparatus 310 and the product to be cooked 30 provided from the user terminal 320, and provide the generated recipe to the cooking apparatus 310 and the user terminal 320. In this case, the recipes individually provided to the cooking apparatus 310 and the user terminal 320 by the server 330 may be different from or identical to each other.

Information including a cooking time, cooking intensity and the like may be provided by the server 330 to the cooking apparatus 310, and position information of the product to be cooked in the cooking apparatus may be provided to the user terminal.

Figure 17:
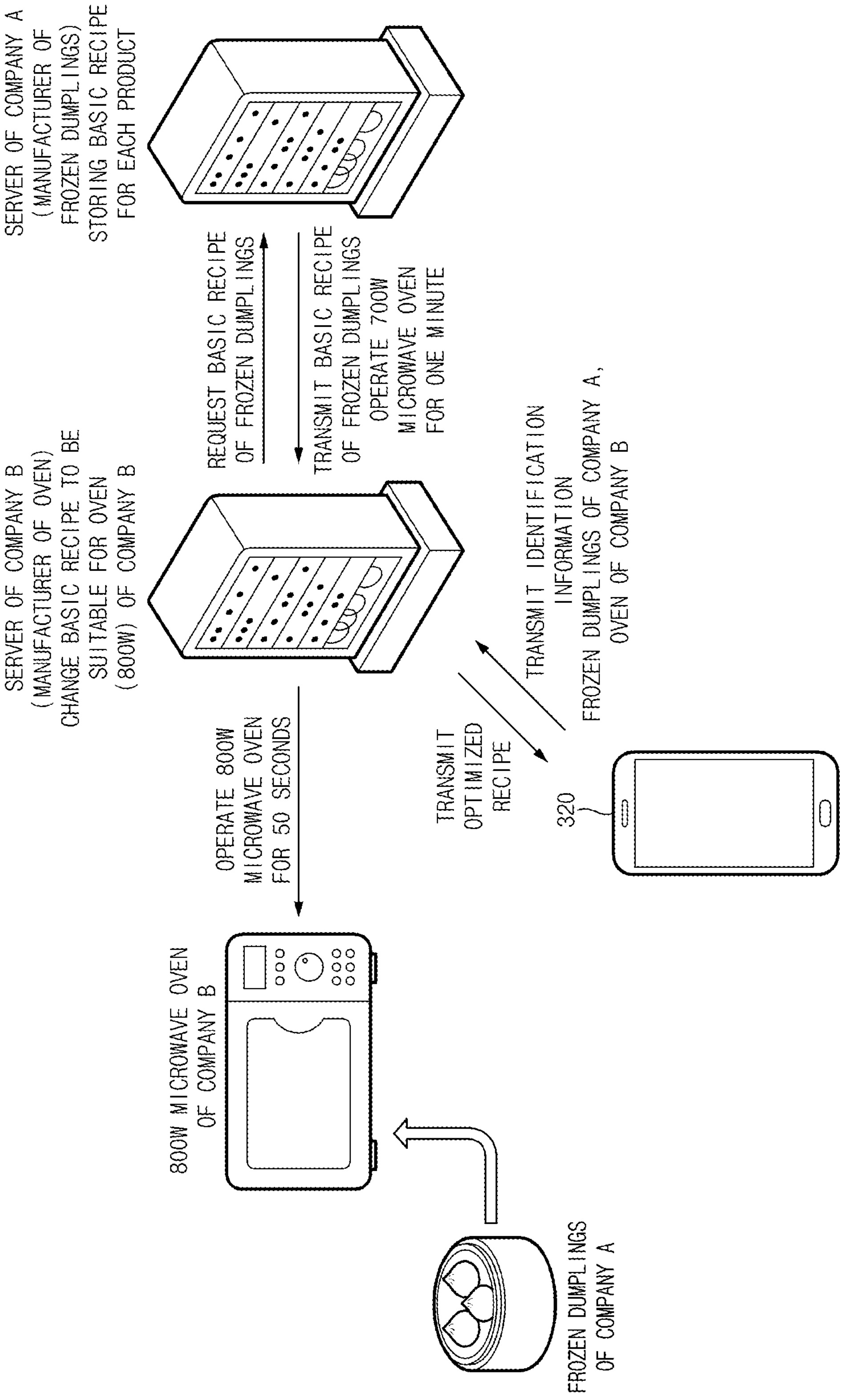
FIGS. 17 and 18 are diagrams for describing an exemplary recipe provided by a recipe providing system according to another embodiment.
Figure 18:
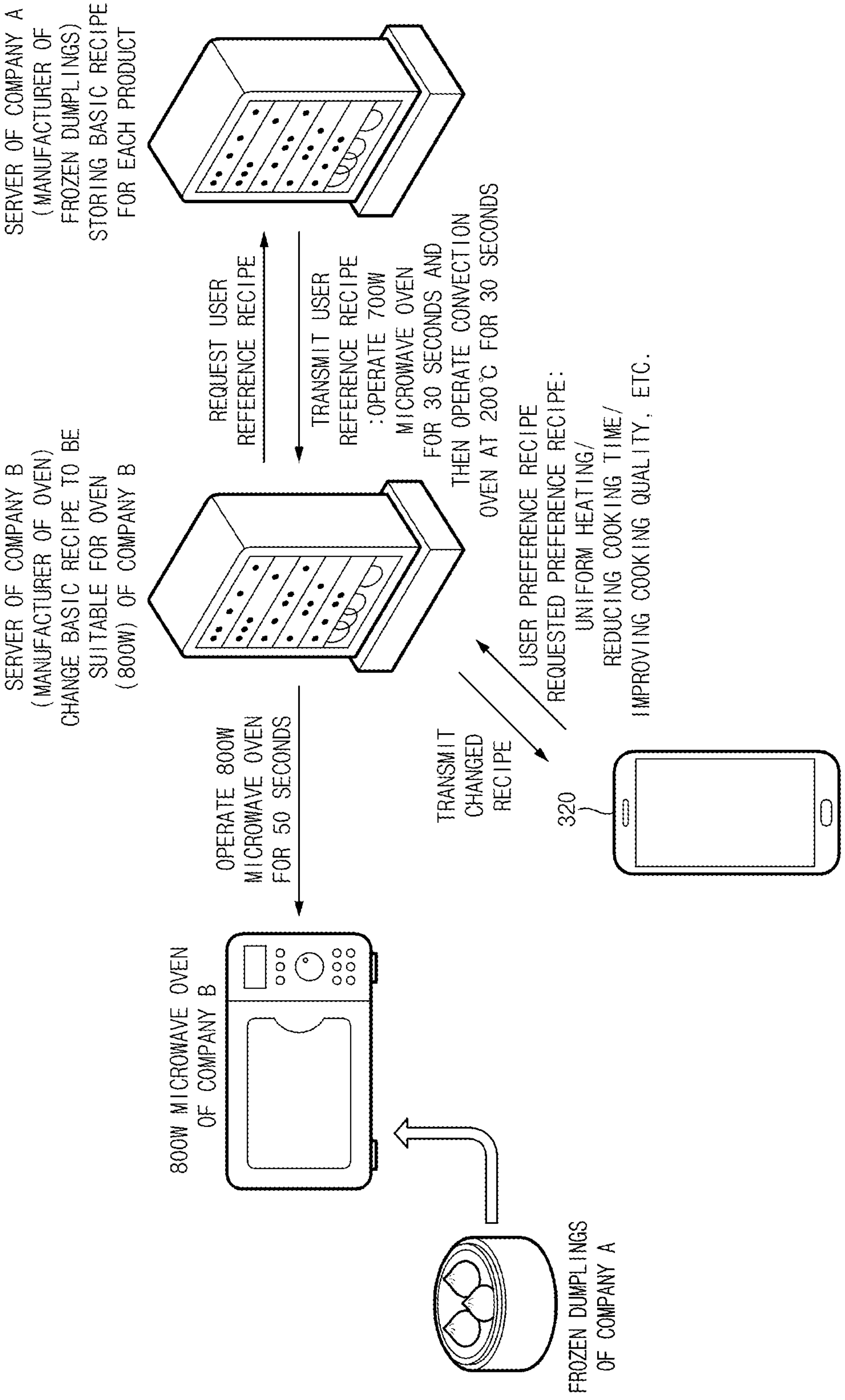

FIGS. 17 and 18 are diagrams for describing an exemplary recipe provided by a recipe providing system according to another embodiment.

Referring to FIG. 17, a first server (e.g., a server of company B) according to an embodiment may receive identification information on a product to be cooked (e.g., frozen dumplings of company A) and a cooking apparatus (e.g., 800 W microwave oven of company B) from the user terminal 310. The first server may be, for example, a server of an oven vendor.

Because the first server does not have a basic recipe for an object to be cooked, the first server may acquire the basic recipe for the object to be cooked from the outside. For example, the first server may transmit identification information on the object to be cooked to a second server (e.g., a server of company A). The second server may be, for example, a server of a frozen dumpling manufacturer. The second server may acquire a basic recipe (e.g., operating a 700 W microwave oven for one minute) for frozen dumplings from a database stored in advance based on the identification information.

The second server may transmit the acquired basic recipe to the first server.

The first server may change the basic recipe to be suitable for the cooking apparatus based on the identification information on the cooking apparatus. The first server may provide an optimized recipe (e.g., operating an 800 W microwave oven for 50 seconds) to the cooking apparatus. The cooking apparatus may heat the product to be cooked for 50 seconds using a microwave according to the provided recipe.

Also, the first server may provide an optimized recipe (e.g., a location of a product to be cooked inside the cooking apparatus) to the user terminal.

Referring to FIG. 18, a first server (e.g., a server of company B) may receive information for a user reference recipe together with identification information on a product to be cooked (e.g., frozen dumplings of company A) and a cooking apparatus (e.g., 800 W microwave oven of company B) from the user terminal 310. The user preference may include, for example, requests such as uniform heating, shorter cooking time and/or improved cooking quality.

Because the first server does not have a basic recipe for an object to be cooked, the first server may acquire the basic recipe for the object to be cooked from the outside. For example, the first server may transmit the identification information on the object to be cooked and the user preference recipe to a second server (e.g., a server of company A). The second server may acquire a basic recipe of frozen dumplings (e.g., operate a 700 W microwave for 30 seconds and then operate a convection oven at 200° C. for 30 seconds), which is suitable for the user preference from a database stored in advance based on the acquired information.

The second server may transmit the basic recipe reflecting the user preference to the first server.

The first server may change the basic recipe to be suitable for the cooking apparatus based on the identification information on the cooking apparatus. The first server may provide an optimized recipe (e.g., operating the cooking apparatus for 50 seconds) to the cooking apparatus. Also, the first server may provide an optimized recipe (e.g., a location of a product to be cooked inside the cooking apparatus) to the user terminal 310.

Figure 19:
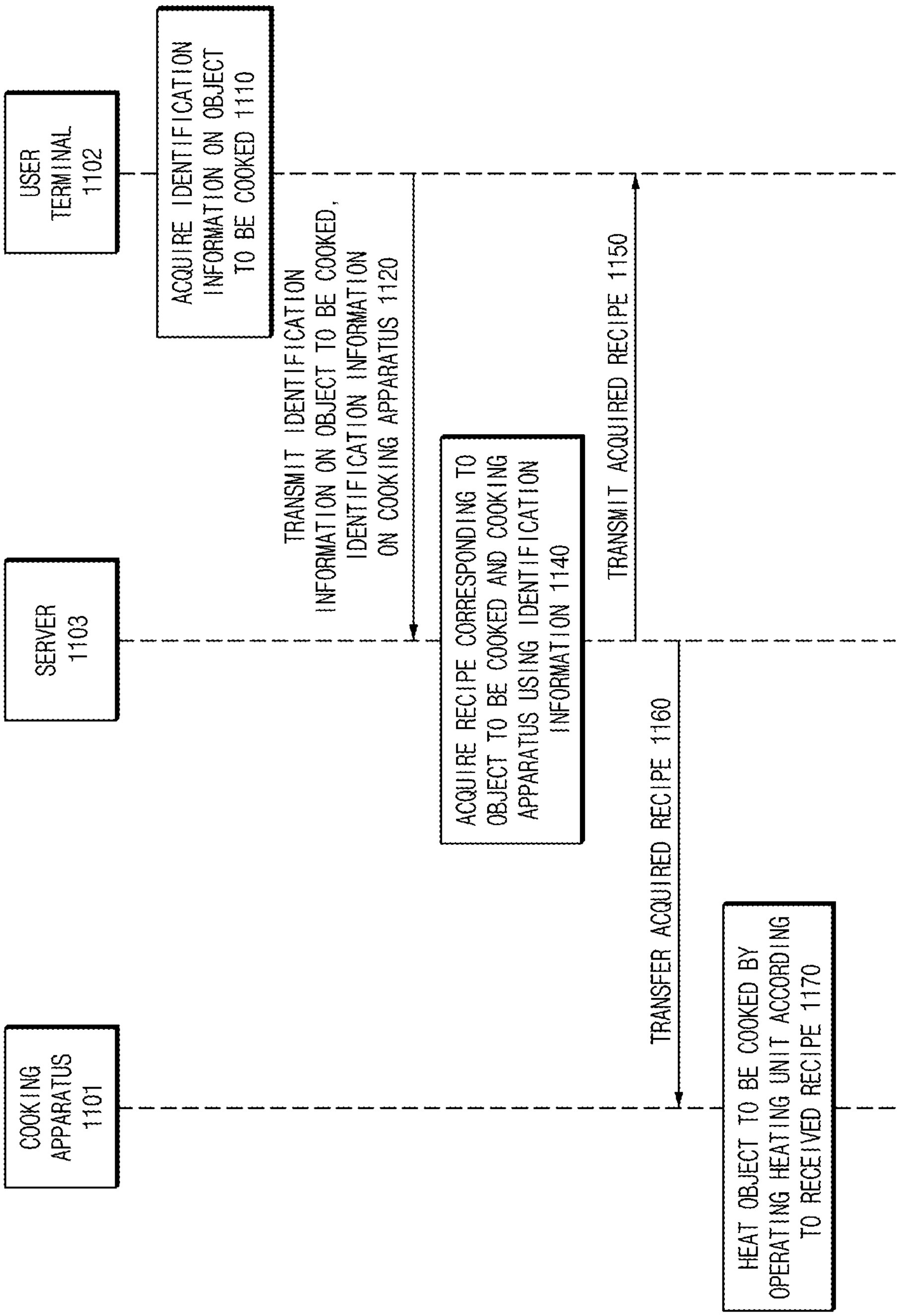
FIG. 19 is a flowchart of a recipe providing method according to another embodiment.

FIG. 19 is a flowchart of a recipe providing method according to another embodiment.

Referring to FIG. 19, the server 1103 may receive identification information on a product to be cooked and information on a cooking apparatus from the user terminal 1102.

The server 1103 may acquire a recipe based on the information of the product to be cooked and the cooking apparatus provided from the user terminal 1102, and the server 1103 may provide the acquired recipe to the cooking apparatus 1101 and the user terminal 1102. In this case, the recipe provided to the cooking apparatus 1101 may include information on a cooking time and heating intensity, and the recipe provided to the user terminal may include information on a location of the product to be cooked inside the cooking apparatus.

Although the embodiments of the present disclosure have been described in more detail with reference to the accompanying drawings, the present disclosure is not necessarily limited to these embodiments, and various modifications may be made within the scope without departing from the technical spirit of the present disclosure. Accordingly, the embodiment disclosed in the present disclosure is not intended to limit the technical idea of the present disclosure but to describe the present disclosure, and the scope of the technical idea of the present disclosure is not limited by the embodiment. Therefore, it should be understood that the embodiments described above are illustrative in all respects and not restrictive. The scope of protection of the present disclosure should be interpreted by the following claims, and all technical ideas within the scope equivalent thereto should be construed as being included in the scope of the present disclosure.

The invention claimed is:

1. A recipe providing system comprising:

a user cooking apparatus configured to cook a product to be cooked according to a recipe;

a user terminal configured to provide identification information on the product to be cooked and information on the user cooking apparatus; and a recipe providing device configured to generate a recipe based on performance of the user cooking apparatus and the identification information on the product to be cooked provided from the user terminal, and provide the generated recipe to the user cooking apparatus and the user terminal, wherein the recipe providing device is further configured to:

store temperature data for each point of the product to be cooked for a standard cooking apparatus, calculate an output reduction rate according to a usage period of the user cooking apparatus, wherein the output reduction rate indicates a reduction rate of an initial power output of the user cooking apparatus, calculate a current power output of the user cooking apparatus according to the output reduction rate and the initial power output of the user cooking apparatus, perform heating prediction for the user cooking apparatus based on one or more parameters associated with the user cooking apparatus, perform change of the recipe based on at least one criterion including: the calculated current power output, an internal volume of the user cooking apparatus, an internal configuration of the user cooking apparatus, and the heating prediction, wherein the change of the recipe comprises a change of a heating time, and a change of a power output of the user cooking apparatus originally set for the recipe, and provide the changed recipe to the user cooking apparatus and the user terminal.

2. The recipe providing system of claim 1, wherein the recipe providing device includes at least one or more servers configured to store information of the product to be cooked corresponding to the identification information on the product to be cooked and information on performance of the standard cooking apparatus.

3. The recipe providing system of claim 2, wherein the recipe providing device is configured to generate the recipe based on the temperature data for the standard cooking apparatus when the user cooking apparatus is identical to the standard cooking apparatus.

4. The recipe providing system of claim 2, wherein the recipe providing device is configured to store information on an output of the standard cooking apparatus, information on a reduction rate of the output according to a usage age and a type of a heat source, and an output control method according to a present or absence of an output control device.

5. The recipe providing system of claim 4, wherein the recipe providing device is configured to generate the recipe based on the temperature data for the standard cooking apparatus, temperature data matching information on the output of the user cooking apparatus, the usage age, the type of the heat source, and the presence or absence of the output control device.

6. The recipe providing system of claim 2, wherein any one of the at least one or more servers is configured to select the standard cooking apparatus of which performance is similar to the performance of the user cooking apparatus when the user cooking apparatus is different from the standard cooking apparatus and generate the recipe by generating the temperature data with respect to the selected standard cooking apparatus through machine learning.

7. The recipe providing system of claim 1, wherein the recipe provided to a user standard cooking apparatus from the recipe providing device includes a cooking time and a cooking intensity, and wherein the recipe provided to the user terminal from the recipe providing device includes a position of the product to be cooked in the user cooking apparatus.

8. The recipe providing system of claim 1, wherein the user cooking apparatus includes an output device configured to provide guidance for a position of the product to be cooked in the user cooking apparatus.

9. The recipe providing system of claim 8, wherein the output device includes at least one or more of a lighting, a speaker, or a display.

10. The recipe providing system of claim 9, wherein the lighting is configured to illuminate a position of the product to be cooked which is to be placed in a turntable.

11. The recipe providing system of claim 10, wherein the speaker is configured to output a position of the product to be cooked through voice.

12. The recipe providing system of claim 10, wherein the display is configured to output a position of the product to be cooked as visual information.

13. The recipe providing system of claim 1, wherein the user cooking apparatus is configured to:

acquire the identification information on the product to be cooked using a sensor or receive the identification information on the product to be cooked input by a user through an input device, heat the product to be cooked through a heat means, transmit and receive data to and from the recipe providing device through a communication circuit, and control operation of the user cooking apparatus through a processor.

14. The recipe providing system of claim 1, wherein the recipe providing device is configured to change a heating time of the recipe according to a cooking purpose.

15. The recipe providing system of claim 14, wherein the cooking purpose includes at least one or more of a uniform internal temperature of the product to be cooked, an arrival to a set lowest or highest temperature, an arrival to a set average temperature, or an arrival to a set surface temperature.

16. The recipe providing system of claim 1, wherein the recipe providing device is configured to learn the recipe based on information on one or more of user preference, additional cooking, a satisfaction level of a cooking result, or an improvement.

17. The recipe providing system of claim 2, wherein all or some of the at least one or more servers are implemented as a cloud-based server.

18. A recipe providing method comprising:

recognizing information on a product to be cooked and a user cooking apparatus using a user terminal;

transmitting the recognized information to a server;

selecting temperature data for each point of the product to be cooked for a standard cooking apparatus and generating a receipt corresponding to a cooking purpose based on the selected temperature data, the temperature data being stored in the server or learned based on the recognized information; and transmitting the generated recipe to the user cooking apparatus and the user terminal, wherein the recipe providing method is further comprising:

calculating an output reduction rate according to a usage period of the user cooking apparatus, wherein the output reduction rate indicates a reduction rate of an initial power output of the user cooking apparatus;

calculating a current power output of the user cooking apparatus according to the output reduction rate and the initial power output of the user cooking apparatus;

perform heating prediction for the user cooking apparatus based on one or more parameters associated with the user cooking apparatus;

perform change of the recipe based on at least one criterion including the calculated current power output, an internal volume of the user cooking apparatus, an internal configuration of the user cooking apparatus, and the heating prediction, wherein the change of the recipe comprises at least one of a change of a heating time, and a change of a power output of the user cooking apparatus originally set for the recipe; and providing the changed recipe to the user cooking apparatus and the user terminal.

* * * * *